United States Patent
Bidarvatan et al.

(10) Patent No.: US 10,730,505 B2
(45) Date of Patent: Aug. 4, 2020

(54) HYBRID ELECTRIC VEHICLE USING INTELLIGENT VEHICLE CONTROLLER

(71) Applicant: KARMA AUTOMOTIVE, LLC, Irvine, CA (US)

(72) Inventors: Mehran Bidarvatan, Irvine, CA (US); Thomas Gacka, Huntington Beach, CA (US)

(73) Assignee: Karma Automotive LLC, Irvine, CA (US)

( * ) Notice: Subject to any disclaimer, the term of this patent is extended or adjusted under 35 U.S.C. 154(b) by 0 days.

(21) Appl. No.: 15/975,587

(22) Filed: May 9, 2018

(65) Prior Publication Data
US 2019/0344776 A1    Nov. 14, 2019

(51) Int. Cl.
| | | |
|---|---|---|
| *B60W 20/13* | (2016.01) | |
| *B60W 20/11* | (2016.01) | |
| *B60W 10/06* | (2006.01) | |
| *B60W 10/26* | (2006.01) | |

(52) U.S. Cl.
CPC ............ *B60W 20/13* (2016.01); *B60W 10/06* (2013.01); *B60W 10/26* (2013.01); *B60W 20/11* (2016.01); *B60W 2510/244* (2013.01); *B60W 2710/0666* (2013.01)

(58) Field of Classification Search
USPC .......................................................... 702/22
See application file for complete search history.

(56) References Cited

U.S. PATENT DOCUMENTS

| | | | | |
|---|---|---|---|---|
| 6,408,968 B1* | 6/2002 | Wakashiro | ............ | H02J 7/1415 180/65.26 |
| 6,727,676 B2* | 4/2004 | Ochiai | ..................... | B60L 58/20 320/104 |
| 6,810,977 B2* | 11/2004 | Suzuki | .................... | F02N 19/10 123/41.14 |
| 7,058,487 B2* | 6/2006 | Hara | ........................ | B60K 6/48 701/22 |
| 7,234,552 B2* | 6/2007 | Prema | ...................... | B60K 6/48 180/65.29 |
| 7,344,129 B2* | 3/2008 | Nemoto | .................. | B60L 50/16 267/140.14 |
| 7,357,204 B2* | 4/2008 | Hisada | ................... | B60K 6/445 180/381 |

(Continued)

*Primary Examiner* — Jean Paul Cass
(74) *Attorney, Agent, or Firm* — Gordon Rees Scully Mansukhani, LLP

(57) ABSTRACT

A hybrid electric vehicle includes an intelligent vehicle controller, an electric motor, a battery, an internal combustion engine (ICE), and an electrical generator coupled to the ICE configured to provide electricity to the battery and the electric motor. The intelligent vehicle controller receives ICE power level shifting data from the electrical generator, ICE, battery, and electric motor. The intelligent vehicle controller determines a desirable torque and/or a desirable revolutions per minute (RPM) for the ICE based on the received ICE power level shifting data by utilizing an efficiency map that includes fuel efficiency contours and noise, vibration, and/or harshness (NVH) level lines for the hybrid electric vehicle. The intelligent vehicle controller may have first and second vehicle operation modes, and may derive first and a second desirable power levels for the ICE in the first and second operation modes, based on the ICE power level shifting data.

20 Claims, 15 Drawing Sheets

(56) References Cited

U.S. PATENT DOCUMENTS

| | | | | |
|---|---|---|---|---|
| 7,377,250 | B1* | 5/2008 | Duffy | B60K 6/46 123/192.1 |
| 7,463,958 | B2* | 12/2008 | Suzuki | B60L 50/61 701/22 |
| 7,513,325 | B2* | 4/2009 | Gebert | B60K 6/48 180/65.285 |
| 7,533,746 | B2* | 5/2009 | Yamaguchi | H02J 7/1423 180/65.29 |
| 8,731,762 | B1* | 5/2014 | Wang | B60L 15/2045 701/22 |
| 9,174,524 | B2* | 11/2015 | Katsumata | B60K 6/46 |
| 9,512,794 | B2* | 12/2016 | Serrano | F02D 41/3058 |
| 2003/0089538 | A1* | 5/2003 | Boggs | B60K 6/365 180/65.235 |
| 2005/0080537 | A1* | 4/2005 | Cawthorne | B60K 6/445 701/51 |
| 2008/0163835 | A1* | 7/2008 | Winstead | F01L 9/04 123/90.11 |
| 2009/0276142 | A1* | 11/2009 | Leone | F02D 13/0215 701/103 |
| 2010/0262343 | A1* | 10/2010 | Eriksson | B60W 10/06 701/54 |
| 2011/0144883 | A1* | 6/2011 | Rollinger | F02D 13/06 701/102 |
| 2013/0151099 | A1* | 6/2013 | Chae | F16H 61/04 701/67 |
| 2014/0121872 | A1* | 5/2014 | Oh | B60K 6/48 701/22 |
| 2015/0233289 | A1* | 8/2015 | Younkins | F02B 77/082 73/114.79 |
| 2016/0236790 | A1* | 8/2016 | Knapp | B64C 11/44 |
| 2016/0284886 | A1* | 9/2016 | Han | H01L 31/02363 |
| 2018/0073413 | A1* | 3/2018 | Nakada | F01N 3/0871 |
| 2018/0202379 | A1* | 7/2018 | Nagashima | F02D 41/3058 |
| 2018/0223876 | A1* | 8/2018 | Martin | F01P 11/12 |
| 2018/0230919 | A1* | 8/2018 | Nagashima | F02D 41/3058 |
| 2018/0257634 | A1* | 9/2018 | Zhao | B60W 30/18172 |
| 2019/0344776 | A1* | 11/2019 | Bidarvatan | B60W 10/26 |

\* cited by examiner

ICE Power Level Constraints

$P_{ICE} < P_{GenMax}$
$P_{ICE} < P_{HVBusMax}$
$P_{ICE} < P_{VehSpd}$    340

------- Normal Mode
— — — Recovery Mode

Cost function = $f$(Fuel consumption, NVH level)

$(Trq_{desirable}, RPM_{desirable}) = (Trq_{ICE}, RPM_{ICE}) | f_{min}$

*subject to:* $P_{ICE} < P_{GenMax}, P_{ICE} < P_{HVBusMax}, P_{ICE} < P_{VehSpd}$

| $P_{ICE}$ | $Trq_{desirable}$ | $RPM_{desirable}$ |
|---|---|---|
| Level 4 | Trq 3 | RPM 3 |
| Level 6 | Trq 4 | RPM 4 |
| Level 12 | Trq 5 | RPM 7 |

Cost function = $f$ (Fuel consumption, NVH level, Weighting factor(s))

$(\text{Trq}_{desirable}, \text{RPM}_{desirable}) = (\text{Trq}_{ICE}, \text{RPM}_{ICE}) \mid f_{min}$ Cost function = $f$ (Fuel consumption, NVH level, Weighting factor(s))

$(Trq_{desirable}, RPM_{desirable}) = (Trq_{ICE}, RPM_{ICE}) \mid f_{min}$

HYBRID ELECTRIC VEHICLE USING INTELLIGENT VEHICLE CONTROLLER

RELATED APPLICATION(S)

The present application is related to concurrently filed U.S. patent application Ser. No. 15/975,555 filed on May 9, 2018, and titled "Intelligent Power Management for a Vehicle." The disclosure in this related application is hereby incorporated fully by reference into the present application.

BACKGROUND

Hybrid electric vehicles having dual power sources, such as a battery, and a chemical power source, such as an internal combustion engine (ICE), are increasingly used for improving energy efficiency and emissions. Many car manufacturers now manufacture at least one model of hybrid electric vehicle. Such hybrid electric vehicles may include intelligent power management systems capable of altering the torque or revolutions per minute (RPM) the ICE runs at. However, conventional intelligent power management systems are often reactive to the actual behavior of the hybrid electric vehicle, rather than predictive, and cannot easily account for other concerns besides driving the hybrid electric vehicle at the speed demanded by the driver.

SUMMARY

The present disclosure is directed to a hybrid electric vehicle using an intelligent vehicle controller, substantially as shown in and/or described in connection with at least one of the figures, and as set forth in the claims.

DETAILED DESCRIPTION

Figure 1:
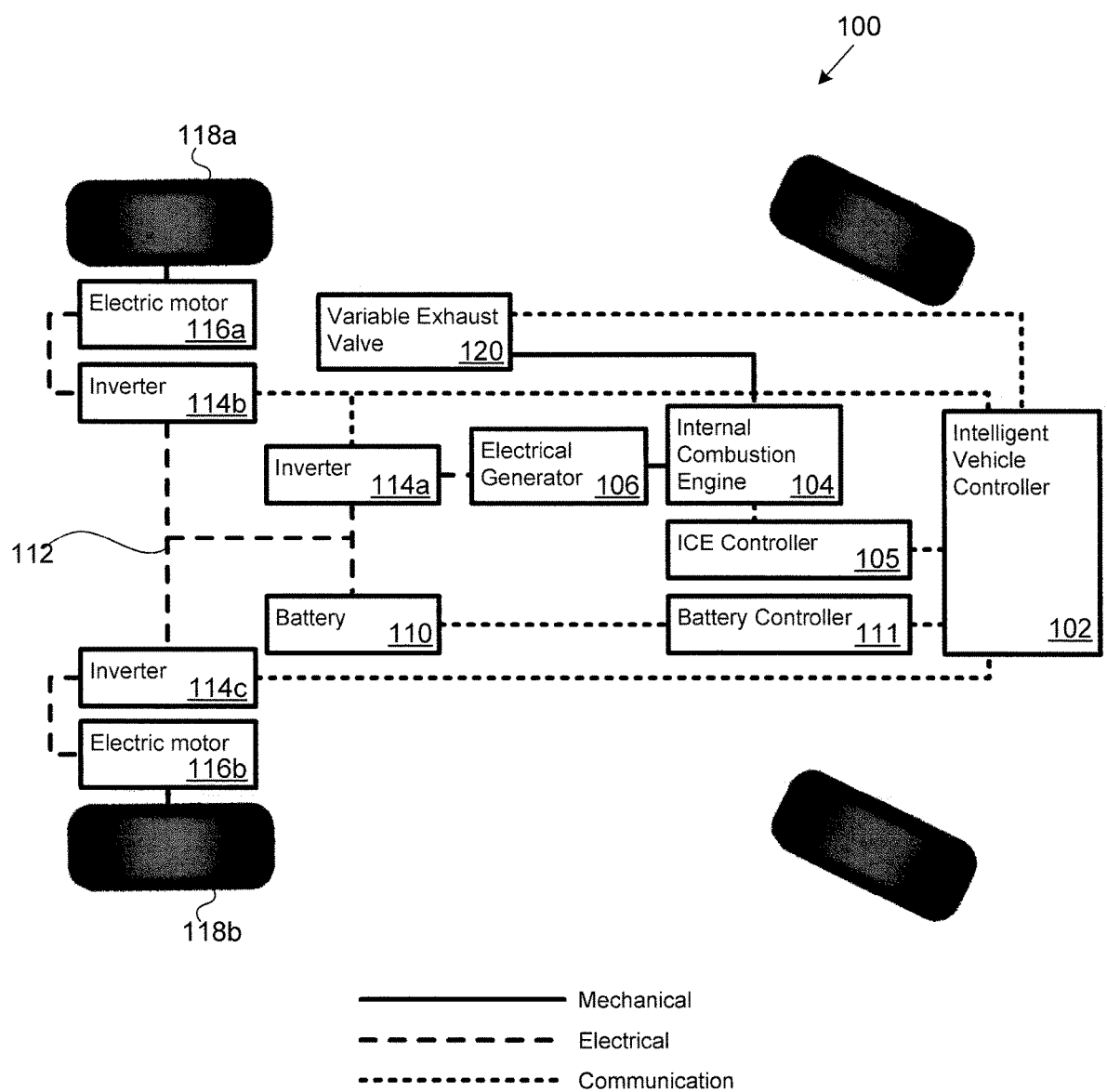
FIG. 1 illustrates a diagram of a portion of an exemplary hybrid electric vehicle according to one implementation of the present application.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a diagram of a portion of an exemplary hybrid electric vehicle according to one implementation of the present application. As illustrated in FIG. 1, hybrid electric vehicle 100 includes intelligent vehicle controller 102, internal combustion engine (ICE) 104, ICE controller 105, electrical generator 106, battery 110, battery controller 111, high voltage (HV) bus 112, inverters 114a, 114b, and 114c, electric motors 116a and 116b, rear drive wheels 118a and 118b, and variable exhaust valve 120.

Intelligent vehicle controller 102 is connected to ICE controller 105, battery controller 111, inverters 114a, 114b, and 114c, and variable exhaust valve 120. In operation, intelligent vehicle controller 102 receives power level shifting data from these various components, determines vehicle operation points for ICE 104 using the power level shifting data, and sends a control signal to ICE controller 105 to run ICE 104 at the determined vehicle operation points. ICE controller 105 can be an electronic control module that controls actuators of ICE 104 to modify ignition timing, fuel pressure, air-fuel ratio, and valve timing, among other characteristics. Thus, intelligent vehicle controller 102 and ICE controller 105 together can run ICE 104 at desirable power levels, desirable torques, and desirable revolutions per minute (RPMs).

ICE 104 can be generally any engine that transforms chemical power from fuel into mechanical power. For example, ICE 104 can be a six cylinder piston engine. In the present implementation, hybrid electric vehicle 100 has a series hybrid drivetrain, and ICE 104 is coupled to electrical generator 106. ICE 104 produces mechanical power and electrical generator 106 converts the mechanical power into electricity. Inverter 114a converts the electricity from alternating current (AC) to direct current (DC), which is then provided to battery 110 and electric motors 116a and 116b. Inverter 114a can be, for example, a bi-directional three-phase inverter.

HV bus 112 carries electricity from inverter 114a to battery 110. Battery 110 uses the electricity to recharge its cells. Battery 110 can be, for example, a nickel metal hydride battery pack, a lithium ion battery pack, or any other type of battery. Battery controller 111 may include monitoring electronics for battery 110. HV bus 112 also carries electricity either from inverter 114a or from battery 110 to inverters 114b and 114c. Inverters 114b and 114c convert the electricity from DC to AC. Inverters 114b and 114c can be, for example, bi-directional three-phase inverters. The AC electricity is then provided to electric motors 116a and 116b. Electric motors 116a and 116b rotate rear drive wheels 118a and 118b. In one implementation, electric motors 116a and 116b rotate a gear box (not shown in FIG. 1), which then rotates rear drive wheels 118a and 118b. Electric motors 116a and 116b can be, for example, induction motors, synchronous motors, reluctance motors, or any other type of electric motor. HV bus 112 can also carry electrical power to other components of hybrid electric vehicle 100, such as, for example, a power steering system (not shown in FIG. 1).

Figure 2:
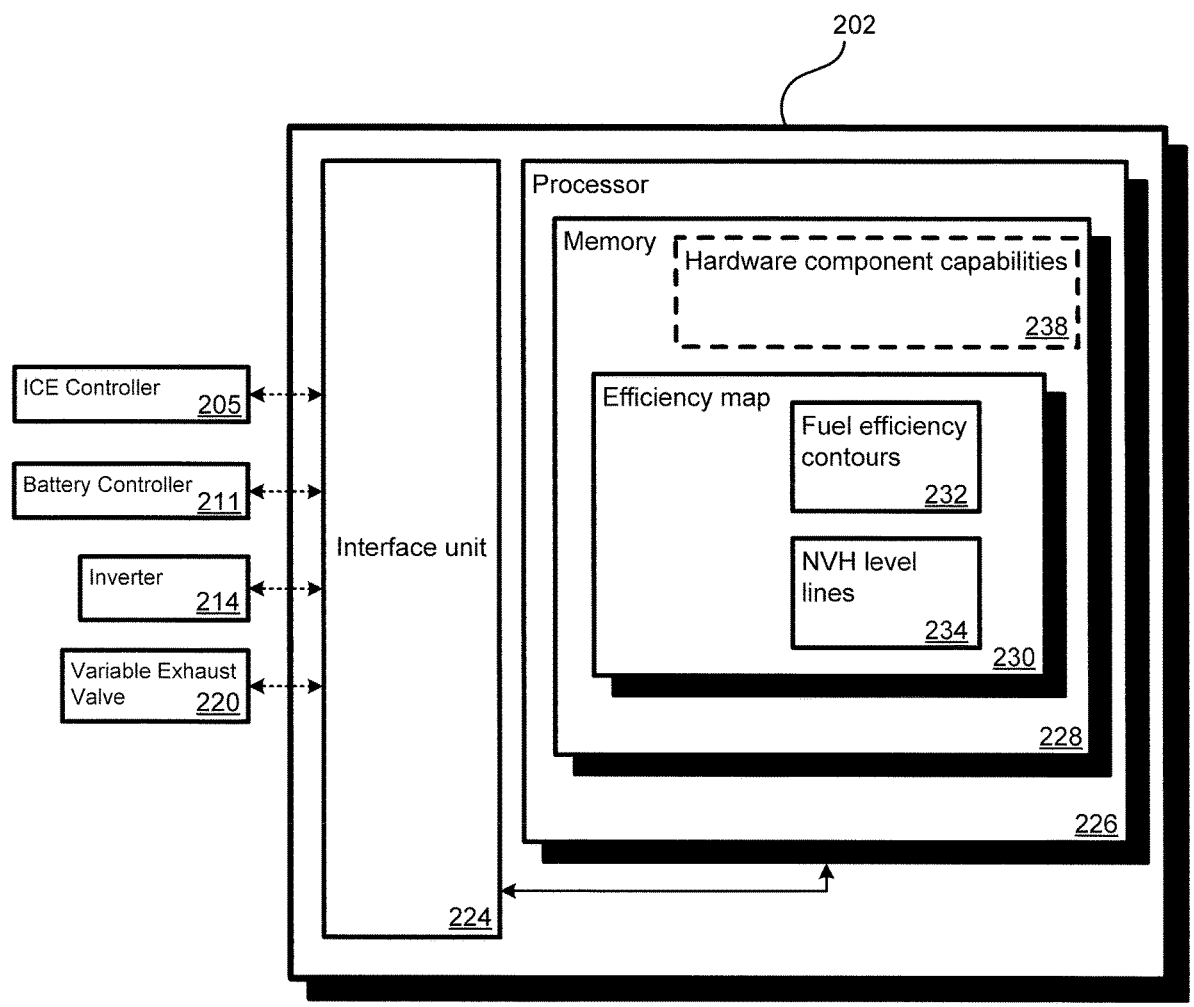
FIG. 2 illustrates a portion of an exemplary intelligent vehicle controller according to one implementation of the present application.

FIG. 2 illustrates a portion of an exemplary intelligent vehicle controller according to one implementation of the present application. As illustrated in FIG. 2, intelligent vehicle controller 202 includes interface unit 224, processor 226, and memory 228. Memory 228 includes efficiency map 230 having fuel efficiency contours 232 and noise, vibration, and/or harshness (NVH) level lines 234. Memory 228 optionally includes hardware component capabilities 238. Intelligent vehicle controller 202 in FIG. 2 generally correspond to intelligent vehicle controller 102 in FIG. 1. FIG. 2 also shows ICE controller 205, battery controller 211, inverter 214, and variable exhaust valve 220, which generally correspond to ICE controller 105, battery controller 111, inverters 214a, 214b, and 214c, and variable exhaust valve 120 respectively in FIG. 1.

Interface unit 224 is connected to ICE controller 205, battery controller 211, and inverter 214, and optionally connected to variable exhaust valve 220. Interface unit 224 and connected components can communicate bi-directionally over a vehicle bus. The vehicle bus can utilize Controller Area Network (CAN) protocol, Local Interconnect Network (LIN) protocol, or any other protocol. Interface unit 224 receives ICE power level shifting data from ICE controller 205, battery 211, inverter 214, and variable exhaust valve 220.

ICE power level shifting data is generally any data relating to a component of hybrid electric vehicle 100 that could indicate that ICE 104 should use more or less power. ICE power level shifting data can represent present measurements, estimates, stored data, and/or maximum safe/recommended values for preventing stress, overheating, etc. For example, ICE power level shifting data from ICE controller 205 can include data regarding throttle command from a driver, temperature, power level, torque, and RPM. ICE power level shifting data from inverter 214 can include electrical generator capabilities, such as input power, temperature, output power, output voltage, and output current of inverter 114a in FIG. 1. ICE power level shifting data from inverter 214 can also include a high voltage bus demand (i.e., the power demanded by inverters 114b and 114c and auxiliary systems, such as a power steering system). ICE power level shifting data from battery controller 211 can include battery charge capabilities, such as capacity and charging rate. ICE power level shifting data from battery controller 211 can also include state-of-charge (SOC) or SOC deficit (i.e., the difference between SOC and a target SOC).

Interface unit 224 is connect to processor 226 and provides ICE power level shifting data to processor 226. Processor 226 can optionally retrieve ICE power level shifting data from memory 228, for example, when ICE power level shifting data is expected to be static, rather than dynamic. As shown in FIG. 2, memory 228 optionally includes hardware component capabilities 238, such as electrical generator capabilities, battery charge capabilities, and high voltage bus capabilities. ICE power level shifting data can be pre-programmed in memory 228, or can be stored in memory 228 after being received by intelligent vehicle controller 202 through interface unit 224.

As discussed below, processor 226 of intelligent vehicle controller 202 derives a desirable power level for ICE 104 by evaluating the ICE power level shifting data, and determines a desirable torque and/or a desirable RPM for ICE 104 utilizing efficiency map 230, which includes fuel efficiency contours 232 and NVH level lines 234.

By determining a desirable torque and/or a desirable RPM for ICE 104 utilizing efficiency map 230, intelligent vehicle controller 202 can advantageously use the desirable torque and/or the desirable RPM to influence operation of hybrid electric vehicle 100. For example, intelligent vehicle controller 202 can generate a control signal for ICE controller 205 based on the desirable torque and/or the desirable RPM, communicate the control signal to ICE controller 205 through interface unit 224, and use ICE controller 205 to run ICE 104 at the desirable torque and/or the desirable RPM. As another example, intelligent vehicle controller 202 can generate a control signal for a driver interface system (not shown in FIG. 2) which can prompt a driver to choose whether or not to allow ICE controller 205 to run ICE 104 at the desirable torque and/or the desirable RPM. As yet another example, intelligent vehicle controller 202 can generate a control signal for variable exhaust valve 220 based on the desirable torque and/or the desirable RPM, communicate the control signal to variable exhaust valve 220 through interface unit 224, and alter exhaust flow in variable exhaust valve 220 based on the desirable torque and/or the desirable RPM.

Figure 3:
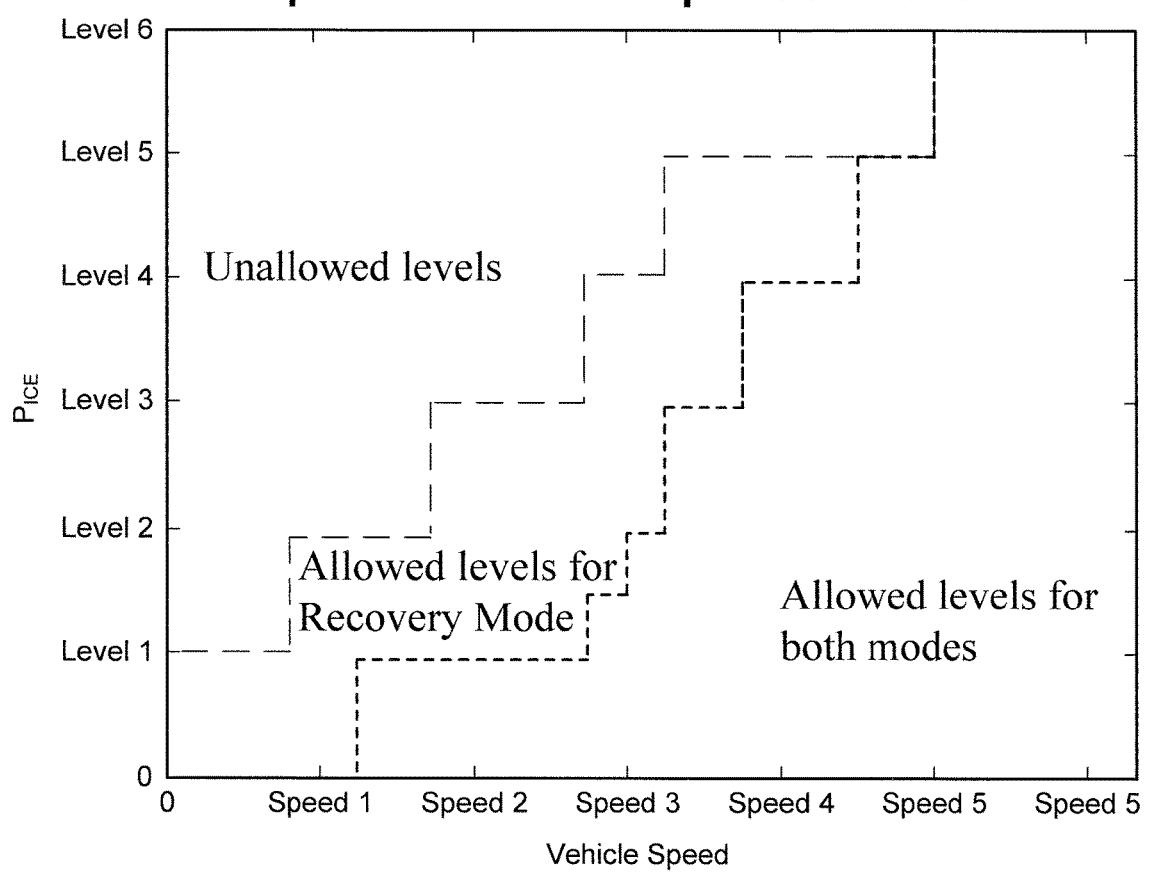
FIG. 3 illustrates a portion of an exemplary table of ICE power level constraints and a portion of an exemplary power level graph according to one implementation of the present application.

FIG. 3 illustrates a portion of an exemplary table of ICE power level constraints and a portion of an exemplary power level graph according to one implementation of the present application. Intelligent vehicle controller 102 in FIG. 1 (or intelligent vehicle controller 202 in FIG. 2) derives a desirable power level for ICE 104 in FIG. 1 by evaluating the ICE power level shifting data. In FIG. 3, table 340 shows exemplary ICE power level constraints that intelligent vehicle controller 102 in FIG. 1 (or intelligent vehicle controller 202 in FIG. 2) can apply based on the received ICE power level shifting data.

As a first example, when intelligent vehicle controller 102 in FIG. 1 (or intelligent vehicle controller 202 in FIG. 2) receives an electrical generator capability, such as a maximum input power, as ICE power level shifting data, intelligent vehicle controller 102 in FIG. 1 (or intelligent vehicle controller 202 in FIG. 2) can constrain the power level of ICE 104 in FIG. 1 such that it is less than a power level that would exceed the maximum input power of inverter 114a in FIG. 1 (or inverter 214 in FIG. 2) (i.e., $P_{ICE} < P_{GenMax}$). As a second example, because electricity from HV bus 112 can be provided either to satisfy a high voltage bus demand or to recharge battery 110, when intelligent vehicle controller 102 in FIG. 1 (or intelligent vehicle controller 202 in FIG. 2) receives a high voltage bus demand and a battery charge capability, such as a maximum charging rate, as ICE power level shifting data, intelligent vehicle controller 102 in FIG. 1 (or intelligent vehicle controller 202 in FIG. 2) can constrain the power level of ICE 104 in FIG. 1 such that it is less than a power level that would exceed a maximum limit of HV bus 112 in FIG. 1 (i.e., $P_{ICE} < P_{HVBusMax}$). As a third example, when intelligent vehicle controller 102 in FIG. 1 (or intelligent vehicle controller 202 in FIG. 2) receives a vehicle speed (presently measured or commanded by a driver) as ICE power level shifting data, intelligent vehicle controller 102 in FIG. 1 (or intelligent vehicle controller 202 in FIG. 2) can constrain the power level of ICE 104 in FIG. 1 based on that vehicle speed (i.e., $P_{ICE} < P_{vehSpd}$), as discussed below.

As illustrated in FIG. 3, power level graph 342 represents the power level of ICE 104 in FIG. 1 (i.e., $P_{ICE}$), versus the speed of hybrid electric vehicle 100. Values of $P_{ICE}$ and vehicle speed shown in FIG. 3 are merely examples and are not intended to correspond to actual numerical values.

As shown in FIG. 3, for a given vehicle speed, intelligent vehicle controller 102 in FIG. 1 (or intelligent vehicle controller 202 in FIG. 2) can constrain the power level of ICE 104 in FIG. 1 to only allow power levels below a given power level threshold. Intelligent vehicle controller 102 in FIG. 1 (or intelligent vehicle controller 202 in FIG. 2) can determine the allowed power levels for a given vehicle speed based on ICE power level shifting data, data stored in memory 228, and/or other factors. For example, intelligent vehicle controller 102 in FIG. 1 (or intelligent vehicle controller 202 in FIG. 2) can use stored correlations between vehicle speeds, NVH levels, and power levels. When intelligent vehicle controller 102 in FIG. 1 (or intelligent vehicle controller 202 in FIG. 2) receives a vehicle speed as ICE power level shifting data, intelligent vehicle controller 102 in FIG. 1 (or intelligent vehicle controller 202 in FIG. 2) can constrain the power level of ICE 104 in FIG. 1 such that it is less than a power level that would exceed an allowed NVH level (i.e., $P_{ICE}<P_{venspa}$) Allowed power levels can be based on other factors, such as vehicle operation modes. As shown in FIG. 3, graph 342 includes two traces. Each trace corresponds to a different vehicle operation mode of intelligent vehicle controller 102 in FIG. 1 (or intelligent vehicle controller 202 in FIG. 2). Each trace represents desirable power levels for ICE 104 in FIG. 1 derived by intelligent vehicle controller 102 in FIG. 1 (or intelligent vehicle controller 202 in FIG. 2) for a given vehicle operation mode. As used herein, a vehicle operation mode refers to the ability of intelligent vehicle controller 102 in FIG. 1 (or intelligent vehicle controller 202 in FIG. 2) to evaluate ICE power level shifting data differently when deriving a desirable power level for ICE 104 in FIG. 1. In the present implementation, intelligent vehicle controller 102 in FIG. 1 (or intelligent vehicle controller 202 in FIG. 2) has two operation modes, corresponding to a normal mode and a recovery mode.

In normal mode, ICE 104 in FIG. 1 is used sparingly as needed to maintain vehicle speed. In the present implementation, normal mode keeps ICE 104 in FIG. 1 off (i.e., $P_{ICE}=0$) when the vehicle speed is below a threshold. In the present implementation, as shown by graph 342, the vehicle speed threshold is a fixed value between Speed 1 and Speed 2. In other implementations, the vehicle speed threshold may be any other fixed value. In another implementation, the vehicle speed threshold may dynamically depend on ICE power level shifting data received by intelligent vehicle controller 102 in FIG. 1 (or intelligent vehicle controller 202 in FIG. 2).

In recovery mode, battery 110 in FIG. 1 is recharged faster at lower speeds. Thus, in recovery mode, the power level of ICE 104 in FIG. 1 that would allow battery 110 in FIG. 1 to recharge an SOC deficit may be greater than in normal mode. In the present implementation, as shown by graph 342, the desirable power level for ICE 104 in FIG. 1 in recovery mode is greater than in normal mode when the vehicle speed is approximately between Speed 4 and Speed 5 or lower.

In other implementations, intelligent vehicle controller 102 in FIG. 1 (or intelligent vehicle controller 202 in FIG. 2) may have more than two vehicle operation modes, or vehicle operation modes besides normal mode and recovery mode. For example, intelligent vehicle controller 102 in FIG. 1 (or intelligent vehicle controller 202 in FIG. 2) may have a sports mode. In sports mode, performance metrics of hybrid electric vehicle 100 can be improved. For example, active suspension systems can be powered on, or throttle responsiveness and/or power steering responsiveness can increase. Thus, in sports mode, the power level of ICE 104 in FIG. 1 that would allow HV bus 112 in FIG. 1 to satisfy a high voltage bus demand may be greater than in normal mode.

In one implementation, intelligent vehicle controller 102 in FIG. 1 (or intelligent vehicle controller 202 in FIG. 2) automatically selects a vehicle operation mode based on the ICE power level shifting data. For example, if an SOC deficit becomes too high while in normal mode, intelligent vehicle controller 102 in FIG. 1 (or intelligent vehicle controller 202 in FIG. 2) can automatically select recovery mode. In one implementation, intelligent vehicle controller 102 in FIG. 1 (or intelligent vehicle controller 202 in FIG. 2) can assign different weighting factors to fuel efficiency contours 232 and NVH level lines 234 of efficiency map 230 based on the selected vehicle operation mode, as discussed below. By utilizing vehicle operation modes, intelligent vehicle controller 102 in FIG. 1 (or intelligent vehicle controller 202 in FIG. 2) can adapt the desirable power level for ICE 104 in FIG. 1 as needed.

In the present implementation, for a given vehicle speed and a given vehicle operation mode, intelligent vehicle controller 102 in FIG. 1 (or intelligent vehicle controller 202 in FIG. 2) can derive a range of desirable power levels. Intelligent vehicle controller 102 in FIG. 1 (or intelligent vehicle controller 202 in FIG. 2) can narrow down a single desirable power level using additional ICE power level shifting data. In the present implementation, the desirable power levels ranges in each vehicle operation mode are discrete. In another implementation, the desirable power levels may be continuous. As discussed below, by deriving a desirable power level, intelligent vehicle controller 102 in FIG. 1 (or intelligent vehicle controller 202 in FIG. 2) can determine a desirable torque and/or a desirable RPM for ICE 104 in FIG. 1 utilizing efficiency map 230.

Figure 4A:
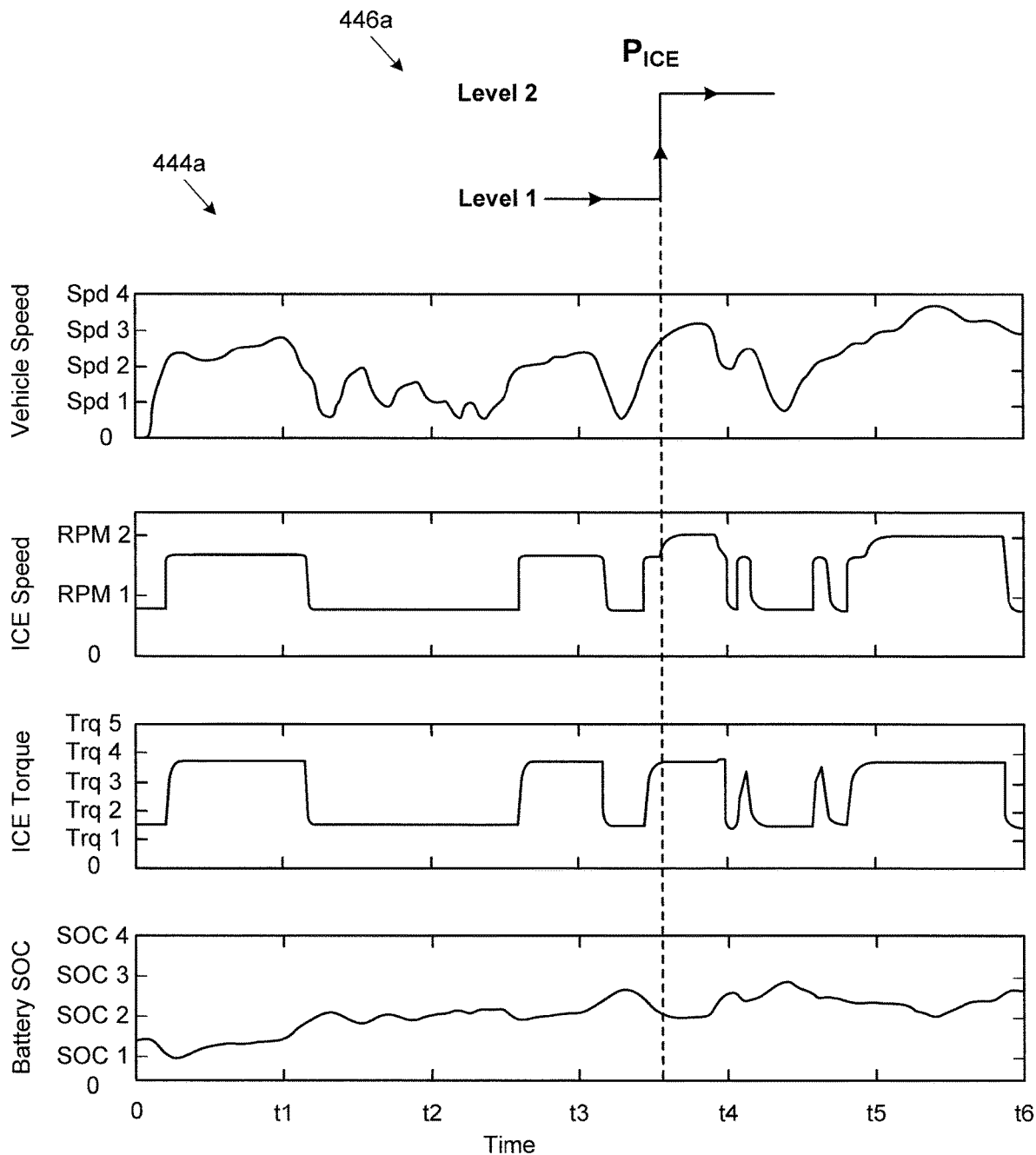
FIGS. 4A, 4B, and 4C each illustrate a portion of an exemplary vehicle drive cycle with a power level shift according to one implementation of the present application.
Figure 4B:
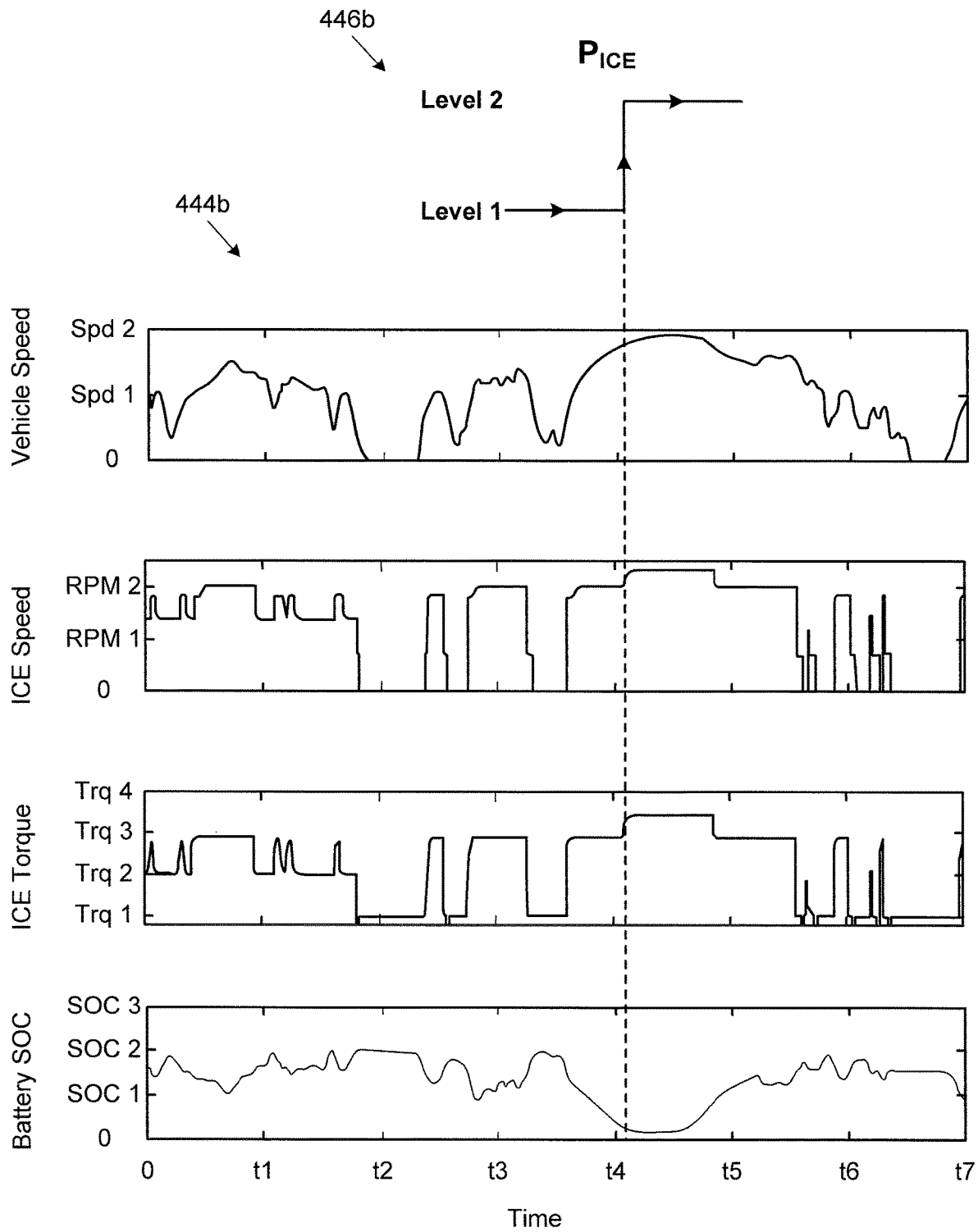
Figure 4C:
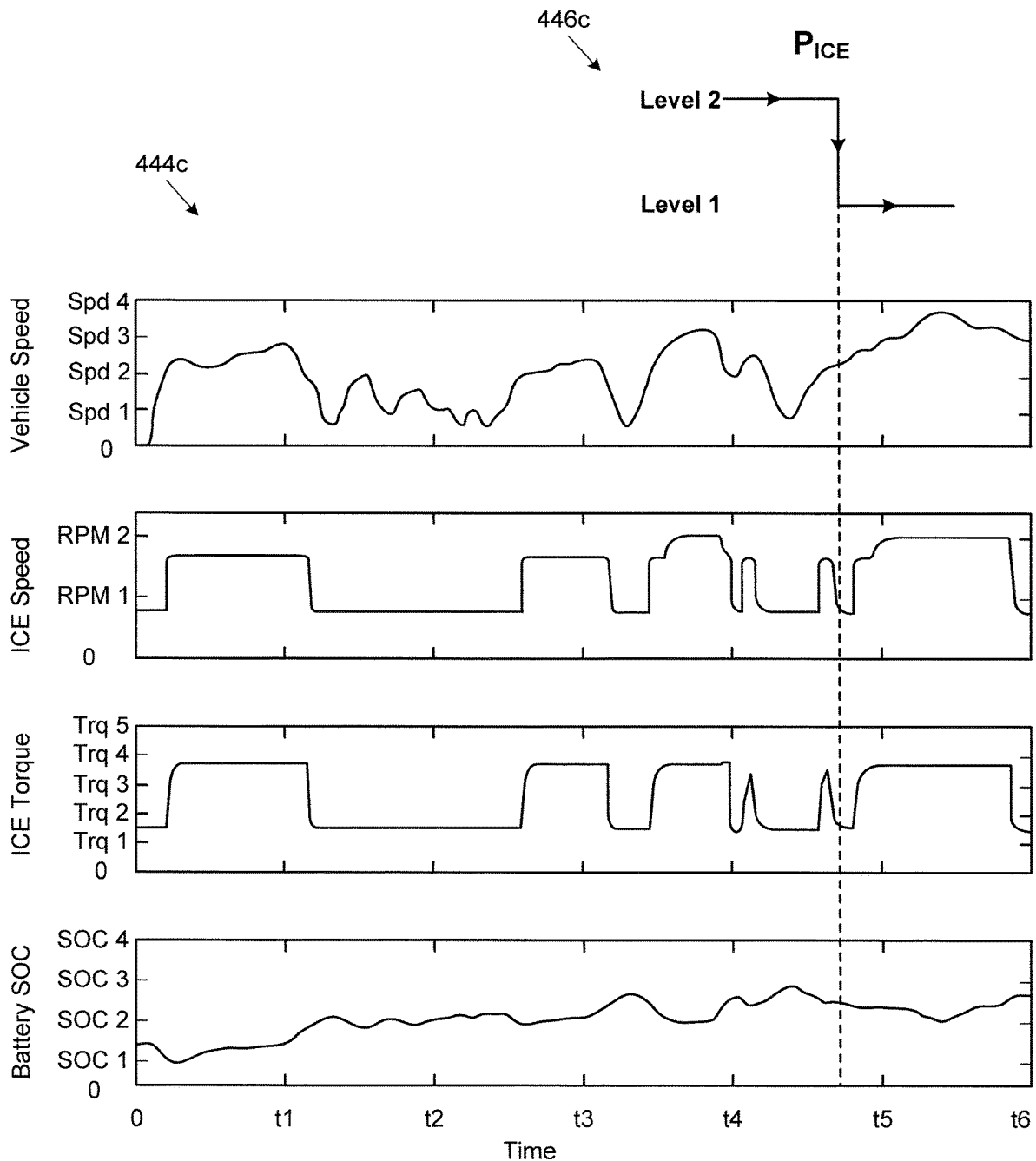

FIGS. 4A, 4B, and 4C each illustrate a portion of an exemplary vehicle drive cycle with a power level shift according to one implementation of the present application. Referring to FIG. 4A, vehicle drive cycle 444a shows graphs of vehicle speed, ICE speed, ICE torque, and battery SOC, versus time. Vehicle drive cycle 444a represents hybrid electric vehicle 100 in FIG. 1 being driven. FIG. 4A also shows power level shift 446a. Power level shift 446a represents intelligent vehicle controller 102 in FIG. 1 (or intelligent vehicle controller 202 in FIG. 2) deriving a new desirable power level for ICE 104 in FIG. 1 in response to changing ICE power level shifting data. As shown in FIG. 4A, the power level for ICE 104 in FIG. 1 shifts up from an old desirable power level to a new desirable power level (i.e., $P_{ICE}$ shifts from Level 1 to Level 2) as a result of vehicle speed increasing approximately between times t3 and t4 in vehicle drive cycle 444a. The new desirable power level may allow reduced power demanded from battery 110 by electrical motors 116a and 116b in FIG. 1.

Referring to FIG. 4B, vehicle drive cycle 444b shows graphs of vehicle speed, ICE speed, ICE torque, and battery SOC, versus time. Vehicle drive cycle 444b represents hybrid electric vehicle 100 in FIG. 1 being driven. FIG. 4B also shows power level shift 446b. Power level shift 446b represents intelligent vehicle controller 102 in FIG. 1 (or intelligent vehicle controller 202 in FIG. 2) deriving a new desirable power level for ICE 104 in FIG. 1 in response to changing ICE power level shifting data. As shown in FIG. 4B, the power level for ICE 104 in FIG. 1 shifts up from an old desirable power level to a new desirable power level (i.e., $P_{ICE}$ shifts from Level 1 to Level 2) as a result of the battery SOC decreasing at approximately time t4 in vehicle drive cycle 444b. The new desirable power level may allow battery 110 in FIG. 1 to recharge an SOC deficit.

Referring to FIG. 4C, vehicle drive cycle 444c shows graphs of vehicle speed, ICE speed, ICE torque, and battery SOC, versus time. Vehicle drive cycle 444c represents hybrid vehicle 100 in FIG. 1 being driven. FIG. 4C also shows power level shift 446c. Power level shift 446c represents intelligent vehicle controller 102 in FIG. 1 (or intelligent vehicle controller 202 in FIG. 2) deriving a new desirable power level for ICE 104 in FIG. 1 in response to changing ICE power level shifting data. As shown in FIG. 4C, the power level for ICE 104 in FIG. 1 shifts down from an old desirable power level to a new desirable power level (i.e., $P_{ICE}$ shifts from Level 2 to Level 1) as a result of a high voltage bus demand decreasing at approximately time t5 in vehicle drive cycle 444c. At this time, the high voltage bus demand decreases despite the vehicle speed and SOC remaining substantially constant. This may correspond, for example, to hybrid electric vehicle 100 driving downhill, or auxiliary systems, such as power steering or active suspension systems, being turned off. The new desirable power level may allow HV bus 112 in FIG. 1 to satisfy a high voltage bus demand.

FIGS. 4A, 4B, and 4C are examples of intelligent vehicle controller 102 in FIG. 1 (or intelligent vehicle controller 202 in FIG. 2) shifting to a new desirable power level for ICE 104 in FIG. 1 in response to a change in vehicle speed, SOC, or high voltage bus demand. However, intelligent vehicle controller 102 in FIG. 1 (or intelligent vehicle controller 202 in FIG. 2) can respond to any type of ICE power level shifting data. Intelligent vehicle controller 102 in FIG. 1 (or intelligent vehicle controller 202 in FIG. 2 can also respond to two or more different types of ICE power level shifting data changing substantially concurrently. The examples in FIGS. 4A, 4B and 4C are generally applicable in any vehicle operation mode.

Figure 5A:
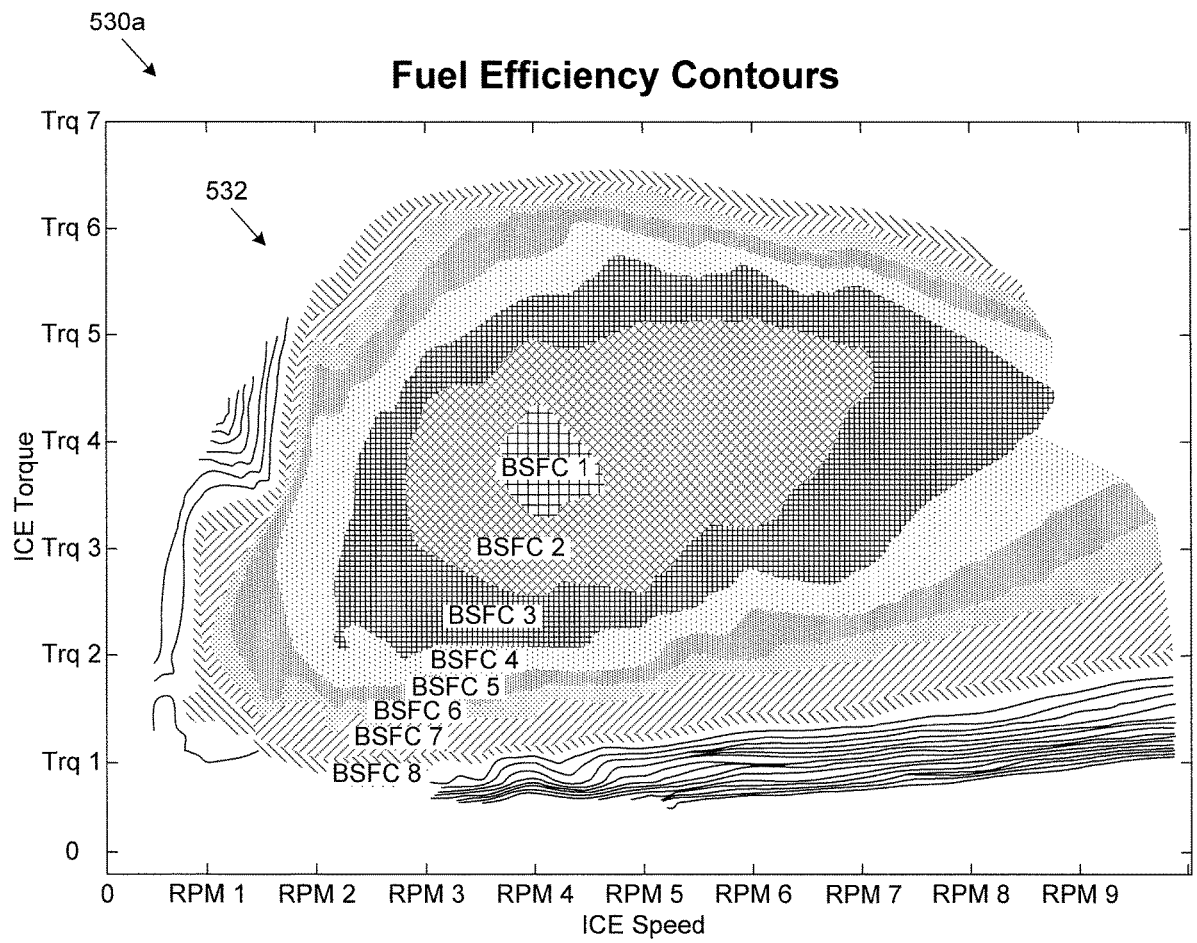
FIG. 5A illustrates a portion of an exemplary fuel efficiency map according to one implementation of the present application.

FIG. 5A illustrates a portion of an exemplary efficiency map with fuel efficiency contours according to one implementation of the present application. As illustrated in FIG. 5A, exemplary fuel efficiency map 530a includes fuel efficiency contours 532. A fuel efficiency contour represents combinations of torques and RPMs of ICE 104 in FIG. 1 at which hybrid electric vehicle 110 has same or similar fuel efficiencies. In the present implementation, fuel efficiency refers to a brake specific fuel consumption (BSFC), i.e., it is the rate of fuel consumption divided by the power produced. BSFC can be measured in grams per kilowatt-hour (g/kWh). Lower BSFC values correspond to better fuel economy of ICE 104 in FIG. 1. A measurement unit & map generator (not shown) can pre-produce fuel efficiency contours 532 shown in efficiency map 530a based on numerous measured values. Intelligent vehicle controller 102 in FIG. 1 (or intelligent vehicle controller 202 in FIG. 2) can store fuel efficiency contours 532 in memory 228 in FIG. 2. In FIG. 5A, each fuel efficiency contour's region is shown by a unique cross-hatching in addition to being identified by a corresponding BSFC value.

Efficiency map 530a in FIG. 5A shows fuel efficiency contours 532 with fuel efficiencies of BSFC 1 up to BSFC 8. BSFC values shown in FIG. 5A are merely examples and are not intended to correspond to actual numerical values. In some implementations, efficiency map 530a may have fuel efficiency contours 532 with different ranges and increments. The shapes of fuel efficiency contours 532 will generally vary between different vehicles. Even though the torques and RPMs of fuel efficiency contours 532 are based on ICE 104 in FIG. 1, because hybrid electric vehicle 100 has a series hybrid drivetrain in the present implementation, the fuel efficiencies of fuel efficiency contours 532 are based on the power produced by electrical generator 106 in FIG. 1, which directly corresponds to the torque and RPM of ICE 104 in FIG. 1. As such, efficiency map 530a accounts for losses in the drivetrain configuration.

Figure 5B:
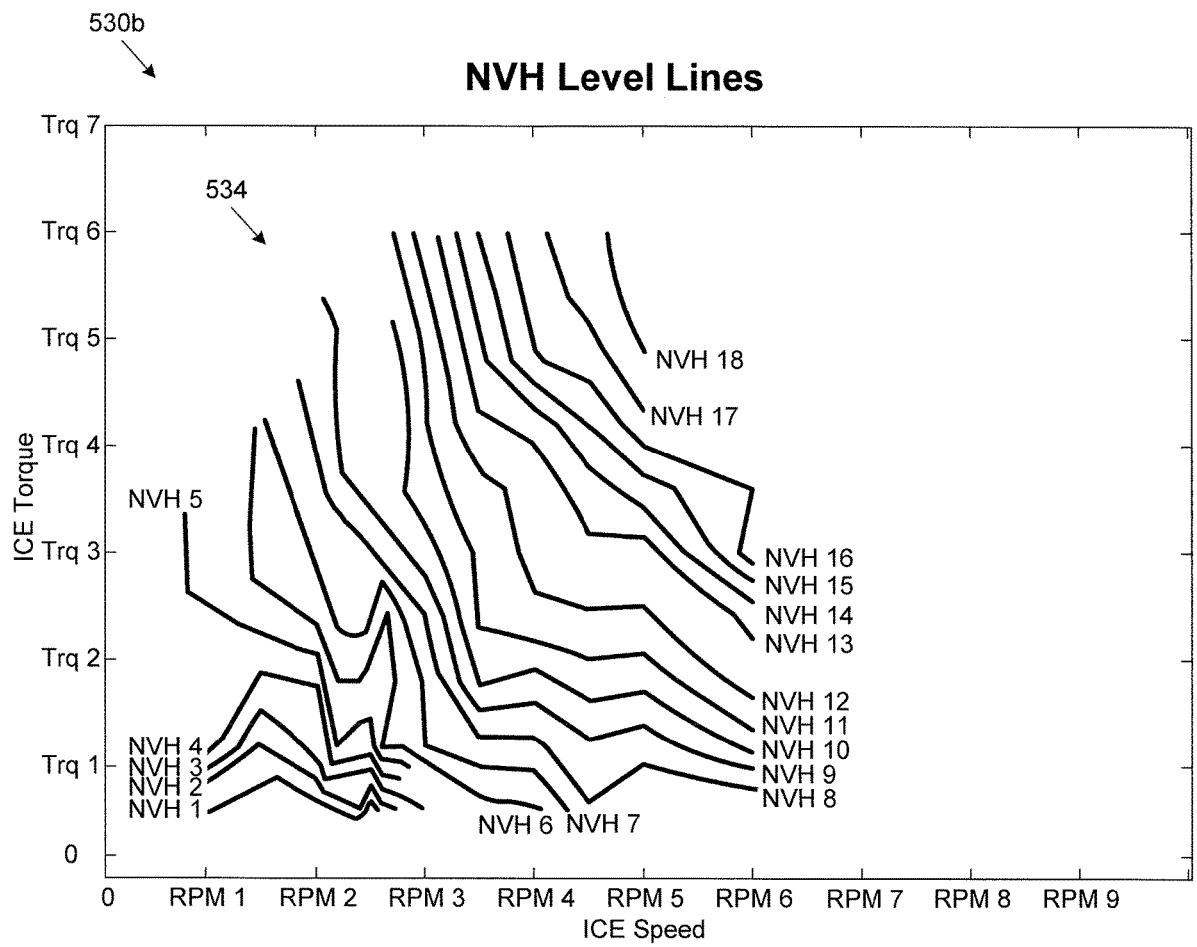
FIG. 5B illustrates a portion of an exemplary NVH level efficiency map according to one implementation of the present application.

FIG. 5B illustrates a portion of an exemplary efficiency map with NVH level lines according to one implementation of the present application. As illustrated in FIG. 5B, NVH level efficiency map 530b includes NVH level lines 534. An NVH level line represents combinations of torques and RPMs of ICE 104 in FIG. 1 at which hybrid electric vehicle 100 has same or similar NVH levels. As used in the present application, an NVH level refers to any combination of noise levels, and/or vibration levels, and/or any other subject measure of harshness. For example, an NVH level may be a weighted product of a noise level and a vibration level. An NVH level may include a decibel (dB) measurement. Lower NVH values may correspond to lower noise levels of ICE 104 in FIG. 1. A measurement unit & map generator (not shown) can pre-produce NVH level lines 534 shown in efficiency map 530b based on numerous measured values. Intelligent vehicle controller 102 in FIG. 1 (or intelligent vehicle controller 202 in FIG. 2) can store NVH level lines 534 in memory 228 in FIG. 2.

Efficiency map 530b in FIG. 5B shows NVH level lines 534 with NVH levels ranging from NVH 1 to NVH 18. NVH values shown in FIG. 5B are merely examples and are not intended to correspond to actual numerical values. In some implementations, efficiency map 530b may have NVH level lines 534 with different ranges and increments. The shapes of NVH level lines 534 will generally vary between different vehicles. Even though the torques and RPMs of NVH level lines 534 are based on ICE 104 in FIG. 1, the NVH levels of NVH level lines 534 may be based on the NVH in a passenger cabin of hybrid electric vehicle 100. Thus, efficiency map 530b may account for dampening properties of the passenger cabin.

Figure 5C:
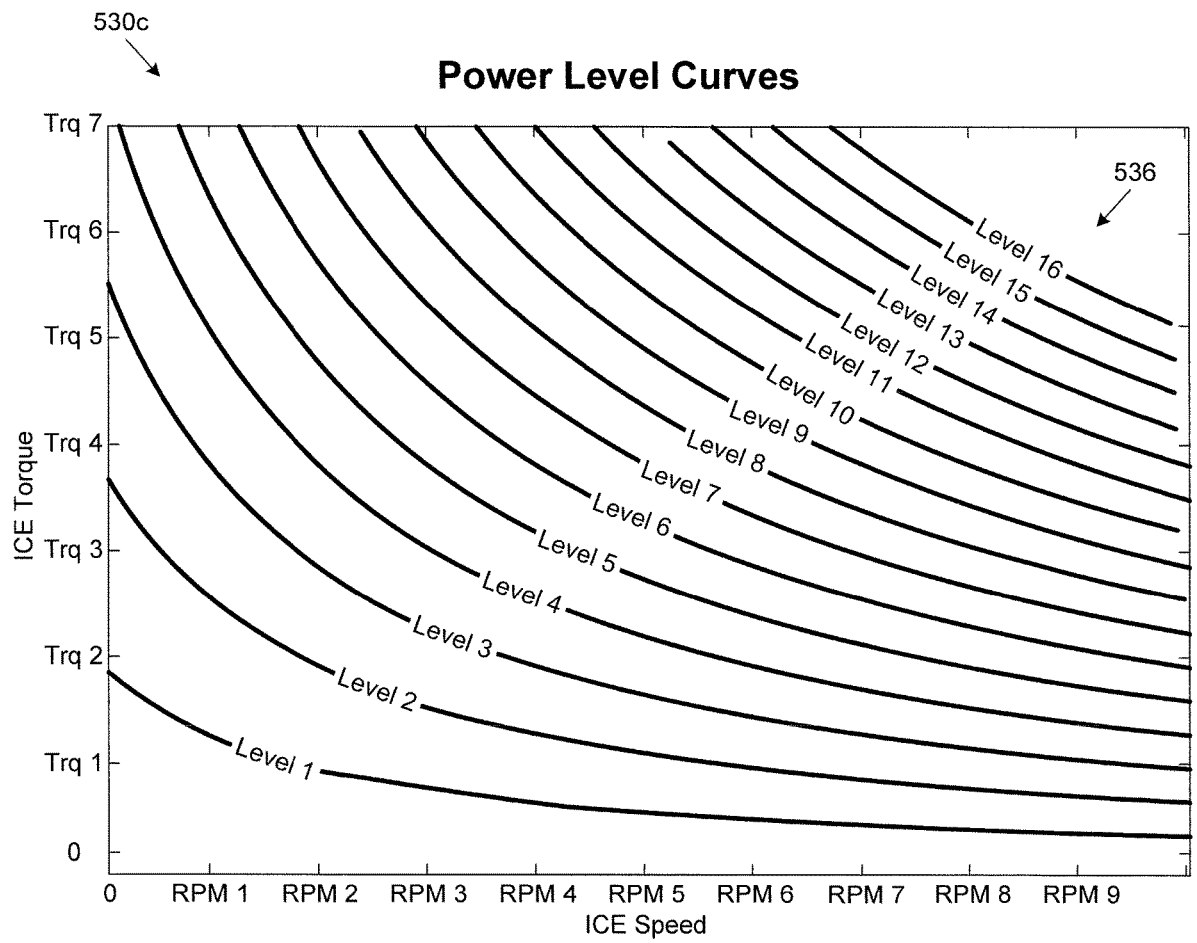
FIG. 5C illustrates a portion of an exemplary power level efficiency map according to one implementation of the present application.

FIG. 5C illustrates a portion of an exemplary efficiency map with power level curves according to one implementation of the present application. As illustrated in FIG. 5C, power level efficiency map 530c includes power level curves 536. A power level curve represents combinations of torques and RPMs of ICE 104 in FIG. 1 at which ICE 104 in FIG. 1 has same or similar power levels. A measurement unit & map generator (not shown) can pre-produce power level curves 536 shown in efficiency map 530b, according to equation (1) below:

Power (kW)=Torque (Nm)×Speed (RPM)÷9,548.8 (Nm×RPM/kW)    Equation (1).

Intelligent vehicle controller 102 in FIG. 1 (or intelligent vehicle controller 202 in FIG. 2) can store power level curves 536 in memory 228 in FIG. 2.

Efficiency map 530c in FIG. 5C shows power level curves with power levels ranging from Level 1 to Level 16. Power level values shown in FIG. 5C are merely examples and are not intended to correspond to actual numerical values. In some implementations, efficiency map 530c may have power level curves with different ranges and increments. Thus, efficiency map 530c may account for running ICE 104 in FIG. 1 at fixed or discrete power levels.

Figure 5D:
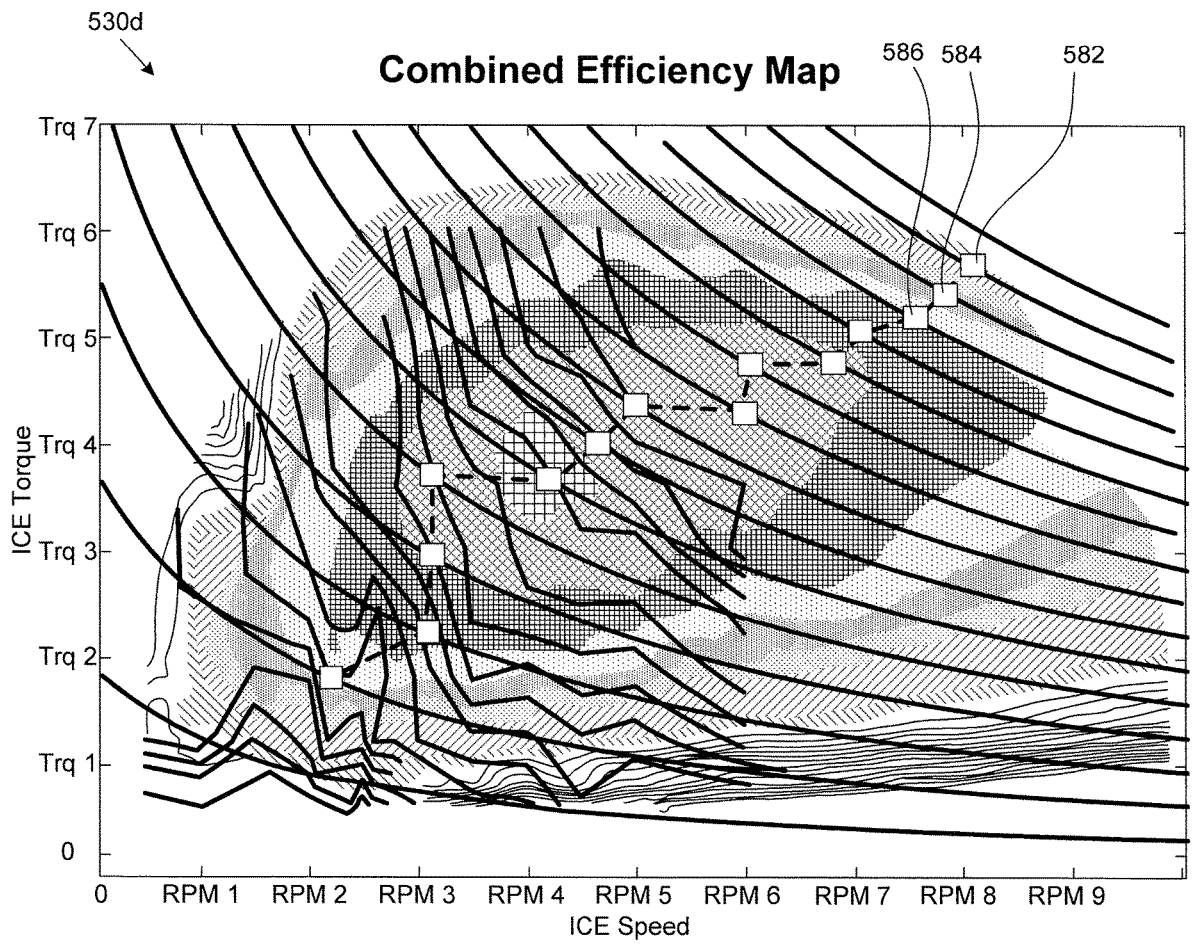
FIG. 5D illustrates a portion of an exemplary combined efficiency map according to one implementation of the present application.

FIG. 5D illustrates a portion of an exemplary combined efficiency map according to one implementation of the present application. As illustrated in FIG. 5D, combined efficiency map 530d includes fuel efficiency contours 532, NVH level lines 534, and power level curves 536 by combining and incorporating fuel efficiency map 530a, NVH level efficiency map 530b, and power level efficiency map 530c. Efficiency map 530d further includes vehicle operation points, indicated visually as squares, such as squares or vehicle operation points 582, 584, and 586, connected by dashed lines. Vehicle operation points of efficiency map 530d represent desirable torques and/or a desirable RPMs for ICE 104 in FIG. 1. That is, when ICE 104 in FIG. 1 is run at a vehicle operation point, hybrid vehicle 100 will exhibit an acceptable NVH level and/or a desired fuel efficiency.

The acceptable NVH level and the desired fuel efficiency of hybrid electric vehicle 100 are generally optimum values determined by intelligent vehicle controller 102 in FIG. 1 (or intelligent vehicle controller 202 in FIG. 2). In the present implementation, intelligent vehicle controller 102 in FIG. 1 (or intelligent vehicle controller 202 in FIG. 2) applies a two-variable cost function based on fuel efficiency and NVH level, as in Equation (2) below:

Cost function=$f$(Fuel consumption,NVH level)   Equation (2).

Intelligent vehicle controller 102 in FIG. 1 (or intelligent vehicle controller 202 in FIG. 2) constrains the cost function to the desirable power level or the desirable range of power levels, as discussed above, as in Equation (3) below:

$f$(Fuel consumption,NVH level)

subject to: $P_{ICE} < P_{GenMax}, P_{ICE} < P_{HVBusMax}, P_{ICE} < P_{VehSpd}$   Equation (3).

Intelligent vehicle controller 102 in FIG. 1 (or intelligent vehicle controller 202 in FIG. 2) then minimizes the cost function to determine a desirable torque and a desirable RPM for ICE 104 in FIG. 1, as in Equation (4) below:

$(Trq_{desirable}, RPM_{desirable}) = (Trq_{ICE}, RPM_{ICE})|f_{min}$   Equation (4).

Thus, the desirable torque and the desirable RPM for ICE 104 in FIG. 1 represent a torque and RPM for which hybrid electric vehicle 100 is optimized in terms of both fuel efficiency and NVH level (for example, where hybrid electric vehicle 100 has the lowest balance of BSFC and noise).

In another implementation, a desirable torque and/or a desirable RPM for ICE 104 in FIG. 1 may correspond to an acceptable NVH level and/or a desired fuel efficiency of hybrid electric vehicle 100 in another manner. For example, intelligent vehicle controller 102 in FIG. 1 (or intelligent vehicle controller 202 in FIG. 2) may determine that an acceptable NVH level and a desired fuel efficiency of hybrid electric vehicle 100 correspond to an intersection of a NVH level line with the lowest noise along a given power level curve, so long as that intersection is within the three best fuel efficiency contours (for example, BSFC 1, BSFC 2, and BSFC 3 in FIG. 5A) along that power level curve. In this implementation, the desirable torque and the desirable RPM for ICE 104 in FIG. 1 represent a torque and RPM for which hybrid electric vehicle 100 is optimized in terms of both fuel efficiency and NVH level, with lenience for fuel efficiency. In another implementation, as discussed below, intelligent vehicle controller 102 in FIG. 1 (or intelligent vehicle controller 202 in FIG. 2) can assign different weighting factors to fuel efficiency contours 532 and NVH level lines 534.

In FIG. 5D, table 550 shows exemplary desirable torques and the desirable RPMs for ICE 104 in FIG. 1. Values of $P_{ICE}$, $Trq_{desirable}$, and $RPM_{desirable}$ shown in FIG. 5D are merely examples and are not intended to correspond to actual numerical values. For the purpose of an example only, a desirable torque and a desirable RPM corresponding to Level 4 is shown by the corresponding row in table 550 by table entries Trq 3 and RPM 4. As another example, a desirable torque and a desirable RPM corresponding to Level 6 is shown by the corresponding row in table 550 by table entries Trq 4 and RPM 4. As yet another example, a desirable torque and a desirable RPM corresponding to Level 12 is shown by the corresponding row in table 550 by table entries Trq 5 and RPM 7.

As discussed above, intelligent vehicle controller 102 in FIG. 1 (or 202 in FIG. 2) can advantageously use the desirable torque and/or the desirable RPM to influence operation of hybrid electric vehicle 100. For example, intelligent vehicle controller 102 in FIG. 1 (or intelligent vehicle controller 202 in FIG. 2) can generate a control signal for ICE controller 105 in FIG. 1 (or ICE controller 205 in FIG. 2) based on the desirable torque and/or the desirable RPM, and ICE controller 105 in FIG. 1 (or ICE controller 205 in FIG. 2) can use the control signal to run ICE 104 in FIG. 1 at the desirable torque and/or the desirable RPM. As another example, intelligent vehicle controller 102 in FIG. 1 (or intelligent vehicle controller 202 in FIG. 2) can generate a control signal for variable exhaust valve 120 in FIG. 1 (or variable exhaust valve 220 in FIG. 2) based on the desirable torque and/or the desirable RPM, and variable exhaust valve 120 in FIG. 1 (or variable exhaust valve 220 in FIG. 2) can use the control signal to alter exhaust flow and to change sound characteristics of hybrid electric vehicle 100.

In one implementation, combined efficiency map 530d includes predetermined vehicle operation points, such as vehicle operation points 582, 584, and 586, for each possible desirable power level for ICE 104 in FIG. 1. Thus intelligent vehicle controller 102 in FIG. 1 (or intelligent vehicle controller 202 in FIG. 2) need not compute a desirable torque and/or a desirable RPM each time the desirable power level shifts. Processing power and processing time can be reduced. And ICE 104 in FIG. 1 can adapt to a desirable torque and/or a desirable RPM faster. Moreover, intelligent vehicle controller 102 in FIG. 1 (or intelligent vehicle controller 202 in FIG. 2) can use adjacent power level curves and corresponding adjacent vehicle operation points of combined efficiency map 530d to interpolate another acceptable vehicle operation point.

With ICE power level shifting data and combined efficiency map 530d, intelligent vehicle controller 102 in FIG. 1 (or intelligent vehicle controller 202 in FIG. 2) can adapt ICE 104 in FIG. 1 to run at desirable operating torques and RPMs in accordance with power level and driving demands. Because efficiency map 530d includes both fuel efficiency contours and NVH level lines, intelligent vehicle controller 102 in FIG. 1 (or intelligent vehicle controller 202 in FIG. 2) accommodates intelligently managing ICE 104 in FIG. 1 so as to balance ICE power level shifting data and driving demands with acceptable NVH levels and desirable fuel efficiencies. Intelligently managing ICE 104 in FIG. 1 with respect to both fuel efficiency and NVH has particular applicability for luxury hybrid electric vehicles, where convenience and comfort are both highly prioritized.

Figure 6A:
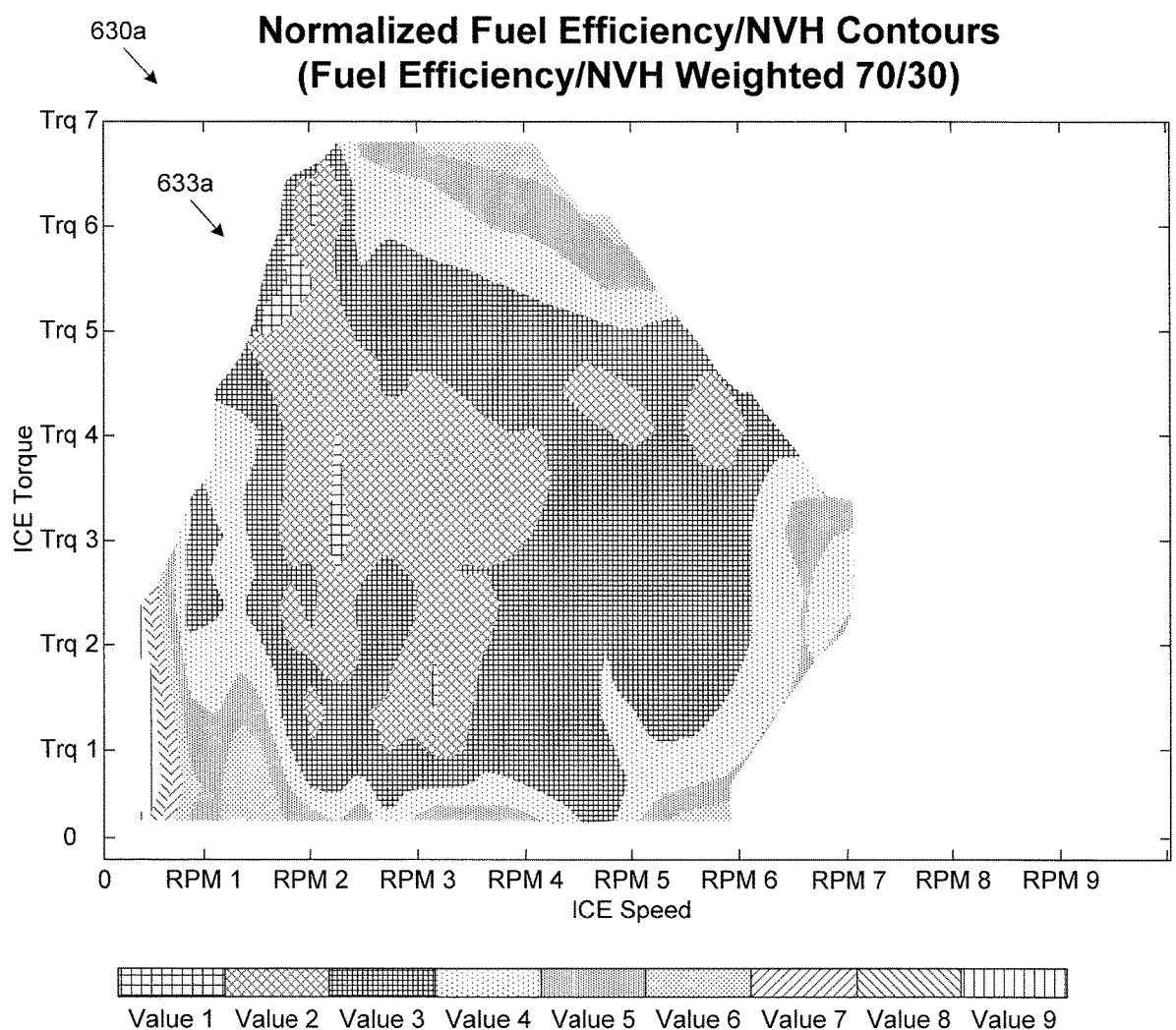
FIGS. 6A and 6B each illustrate a portion of an exemplary normalized fuel efficiency and NVH level map according to one implementation of the present application.
Figure 6B:
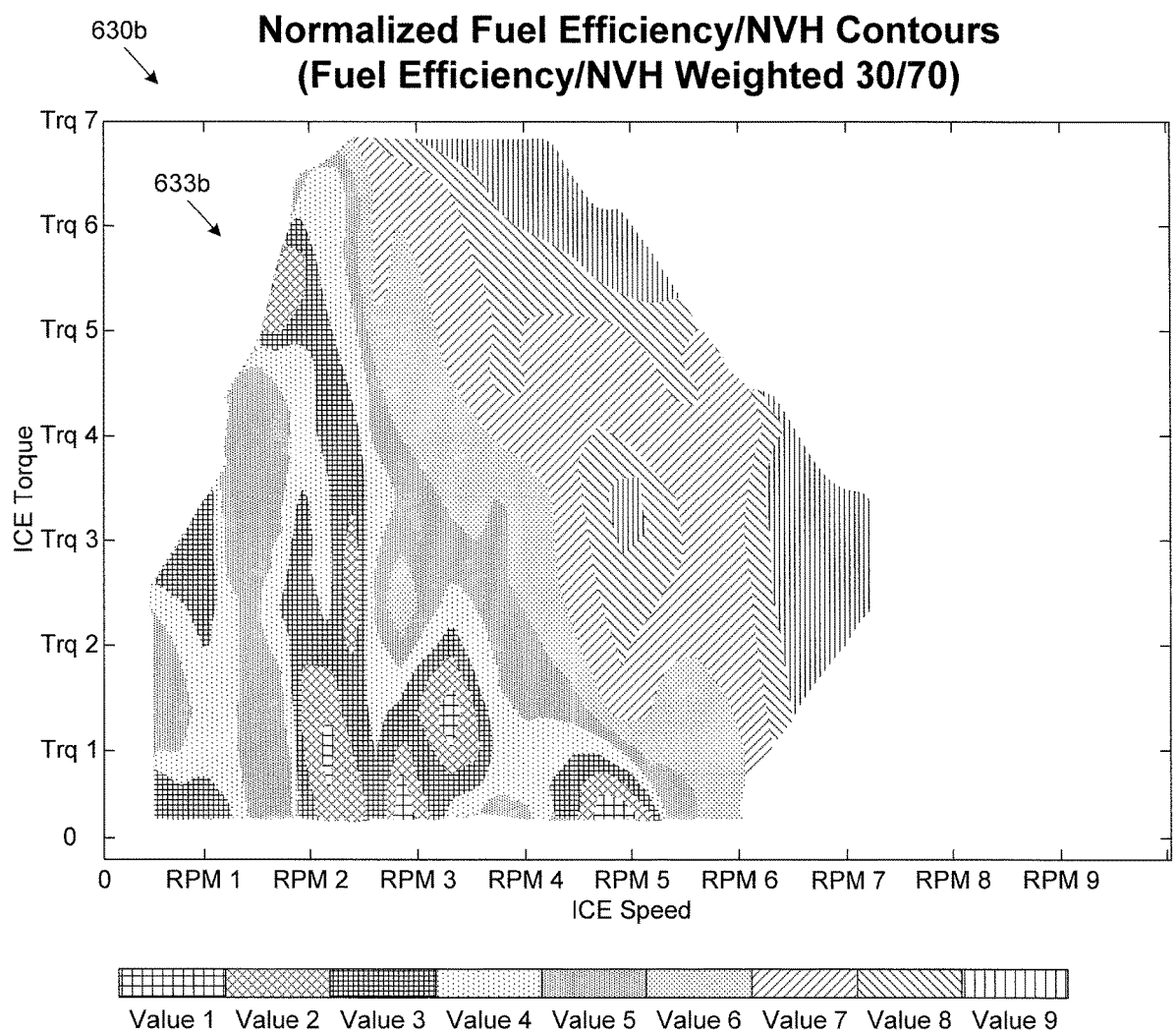

FIGS. 6A and 6B each illustrate a portion of an exemplary normalized fuel efficiency and NVH level map according to one implementation of the present application. As illustrated in FIG. 6A, exemplary normalized fuel efficiency and NVH level map 630a includes normalized fuel efficiency/NVH level contours 633a. A normalized fuel efficiency/NVH level contour represents both fuel efficiency and NVH level. For example, normalized fuel efficiency/NVH level contours 633a may represent products of fuel efficiency contours 532 in FIG. 5A and NVH level lines 534 in FIG. 5B after normalization. Likewise, as illustrated in FIG. 6B, exemplary normalized fuel efficiency and NVH level map 630b includes normalized fuel efficiency/NVH level contours 633b, and normalized fuel efficiency/NVH level contours 633b may represent products of fuel efficiency contours 532 in FIG. 5A and NVH level lines 534 in FIG. 5B after normalization. Normalized contour values may include a product of BSFC and dB. Lower values correspond to better fuel economy and lower NVH levels of ICE 104 in FIG. 1. A measurement unit & map generator (not shown) can pre-produce normalized fuel efficiency/NVH level contours 633a and 633b shown in normalized fuel efficiency and NVH level maps 630a and 630b based on numerous measured values. Intelligent vehicle controller 102 in FIG. 1 (or intelligent vehicle controller 202 in FIG. 2) can store normalized fuel efficiency/NVH level contours 633a and 633b in memory 228 in FIG. 2. In FIGS. 6A and 6B, each normalized fuel efficiency/NVH level contour's region is shown by a unique cross-hatching in addition to being identified by a corresponding value.

Normalized fuel efficiency and NVH level maps 630a and 630b in FIGS. 6A and 6B show normalized fuel efficiency/NVH level contours 633a and 633b with values of Value 1 up to Value 9. Values shown in FIGS. 6A and 6B are merely examples and are not intended to correspond to actual numerical values. In some implementations, Normalized fuel efficiency and NVH level maps 630a and 630b may have normalized fuel efficiency/NVH level contours 633a and 633b with different ranges and increments. The shapes of normalized fuel efficiency/NVH level contours 633a and 633b will generally vary between different vehicles and weighting factors. In one implementation, normalized contours may be adapted to normalize and include emissions measurements, in addition to both fuel efficiencies and NVH levels.

As illustrated in FIGS. 6A and 6B, by using normalized fuel efficiency/NVH level contours 633a and 633b, intelligent vehicle controller 102 in FIG. 1 (or intelligent vehicle controller 202 in FIG. 2) can assign different weighting factors to fuel efficiency and NVH levels. In the implementation shown in FIG. 6A, intelligent vehicle controller 102 in FIG. 1 (or intelligent vehicle controller 202 in FIG. 2) assigns fuel efficiency a weighting factor of 70%, and assigns NVH level a weighting factor of 30%. In the implementation shown in FIG. 6B, intelligent vehicle controller 102 in FIG. 1 (or intelligent vehicle controller 202 in FIG. 2) assigns fuel efficiency a weighting factor of 30%, and assigns NVH level a weighting factor of 70%. Notably, each normalized fuel efficiency/NVH level contour's region is different between the implementations of FIGS. 6A and 6B. In one implementation, intelligent vehicle controller 102 in FIG. 1 (or intelligent vehicle controller 202 in FIG. 2) assigns weighting factors based on the selected vehicle operation mode. In various implementations, weighting factors other than 70% and 30% may be used. In one implementation, weighting factors can be assigned to emissions measurements, in addition to both fuel efficiencies and NVH levels.

By assigning weighting factors to normalized fuel efficiency/NVH level contours 633a and 633b, as discussed below, intelligent vehicle controller 102 in FIG. 1 (or intelligent vehicle controller 202 in FIG. 2) may determine different desirable torques and/or a desirable RPMs for ICE 104 in FIG. 1 based on the assigned weighting factors when utilizing combined efficiency maps. Thus, ICE 104 can be run efficiently while allowing prioritization or leniency with respect to fuel efficiency, NVH levels, emission outputs, etc.

Figure 7A:
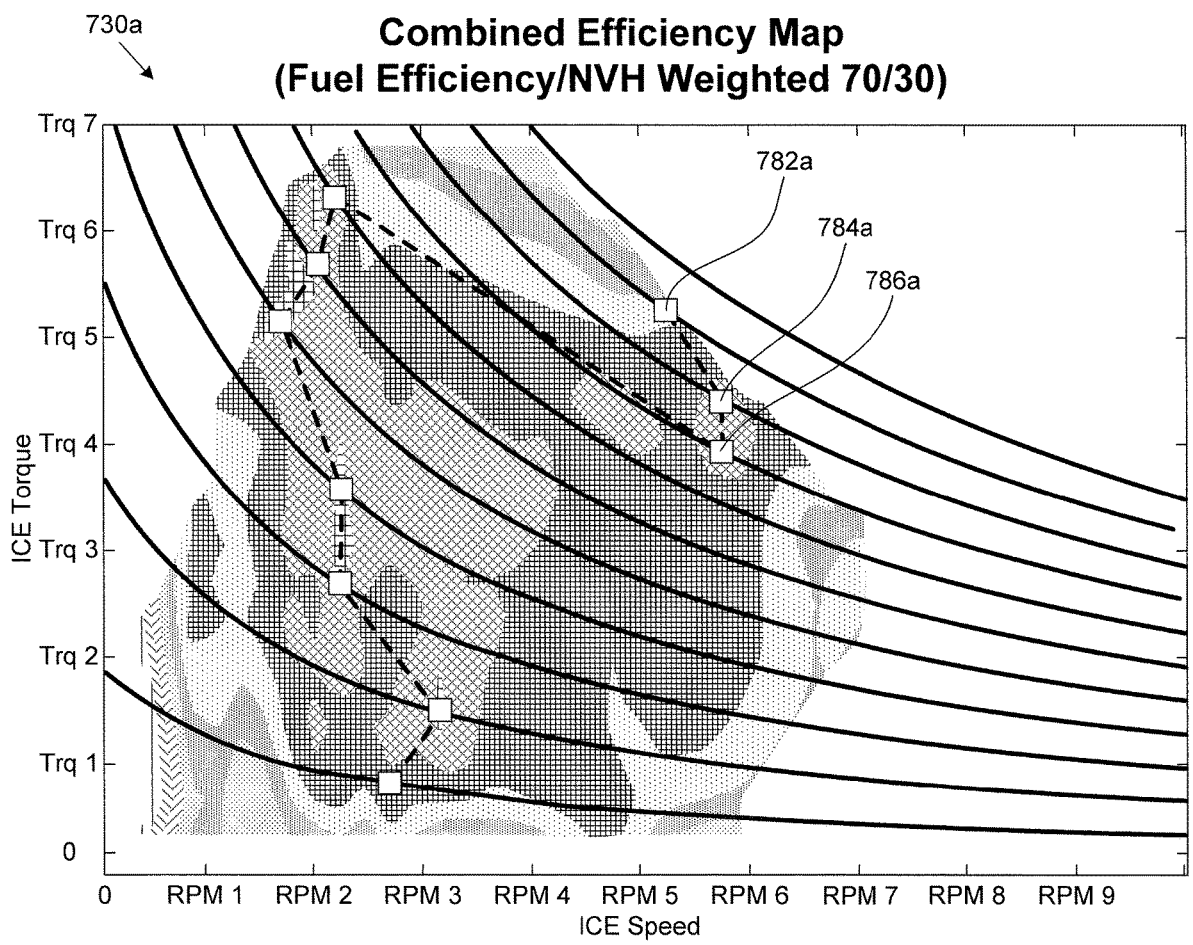
FIGS. 7A and 7B each illustrate a portion of an exemplary combined efficiency map according to one implementation of the present application.
Figure 7B:
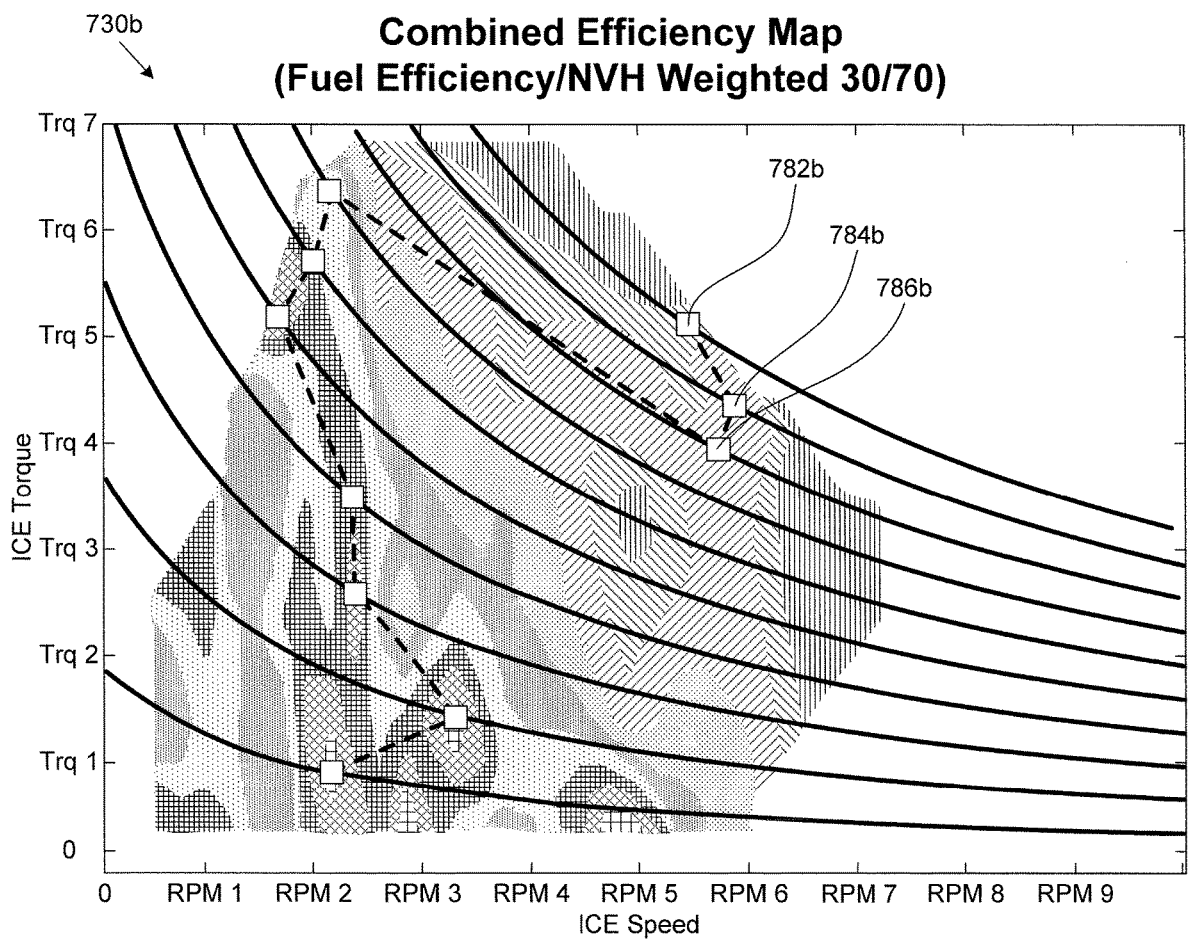

FIGS. 7A and 7B each illustrate a portion of an exemplary combined efficiency map according to one implementation of the present application. As illustrated in FIG. 7A, combined efficiency map 730a includes normalized fuel efficiency/NVH level contours 633a and power level curves 536 by combining and incorporating normalized fuel efficiency and NVH level map 630a and power level efficiency map 530c. Likewise, as illustrated in FIG. 7B, combined efficiency map 730b includes normalized fuel efficiency/NVH level contours 633b and power level curves 536 by combining and incorporating normalized fuel efficiency and NVH level map 630b and power level efficiency map 530c. Efficiency maps 730a and 730b further include vehicle operation points, indicated visually as squares, such as squares or vehicle operation points 782a, 784a, and 786a, and 782b, 784b, and 786b respectively connected by dashed lines. Vehicle operation points of efficiency maps 730a and 730b represent desirable torques and/or a desirable RPMs for ICE 104 in FIG. 1. That is, when ICE 104 in FIG. 1 is run at a vehicle operation point, hybrid vehicle 100 will exhibit an acceptable NVH level and/or a desired fuel efficiency.

Unlike in the implementation shown in FIG. 5D, in the implementations shown in FIGS. 7A and 7B, intelligent vehicle controller 102 in FIG. 1 (or intelligent vehicle controller 202 in FIG. 2) applies a cost function with three or more variables, based on fuel efficiency, NVH level, and the assigned weighting factor(s), as in Equation (5) below:

Cost function=ƒ(Fuel consumption,NVH level, Weighting factor(s))     Equation (5).

A desirable torque and a desirable RPM for ICE 104 in FIG. 1 can otherwise be determined by intelligent vehicle controller 102 in FIG. 1 (or intelligent vehicle controller 202 in FIG. 2) according to any manner described above.

By assigning weighting factors to normalized fuel efficiency/NVH level contours 633a and 633b, intelligent vehicle controller 102 in FIG. 1 (or intelligent vehicle controller 202 in FIG. 2) may determine different desirable torques and/or a desirable RPMs for ICE 104 in FIG. 1 based on the assigned weighting factors when utilizing combined efficiency maps 730a and 730b. For example, in FIG. 7A, where fuel efficiency is assigned a weighting factor of 70% and NVH level is assigned a weighting factor of 30%, the first vehicle operation point along the lowest power level curve lies approximately at RPM 3 and slightly below Trq 1. In FIG. 7B, where fuel efficiency is assigned a weighting factor of 30% and NVH level is assigned a weighting factor of 70%, the first vehicle operation point along the lowest power level curve is shifted up compared to FIG. 7A, and lies approximately at RPM 2 and approximately at Trq 1.

Figure 8:
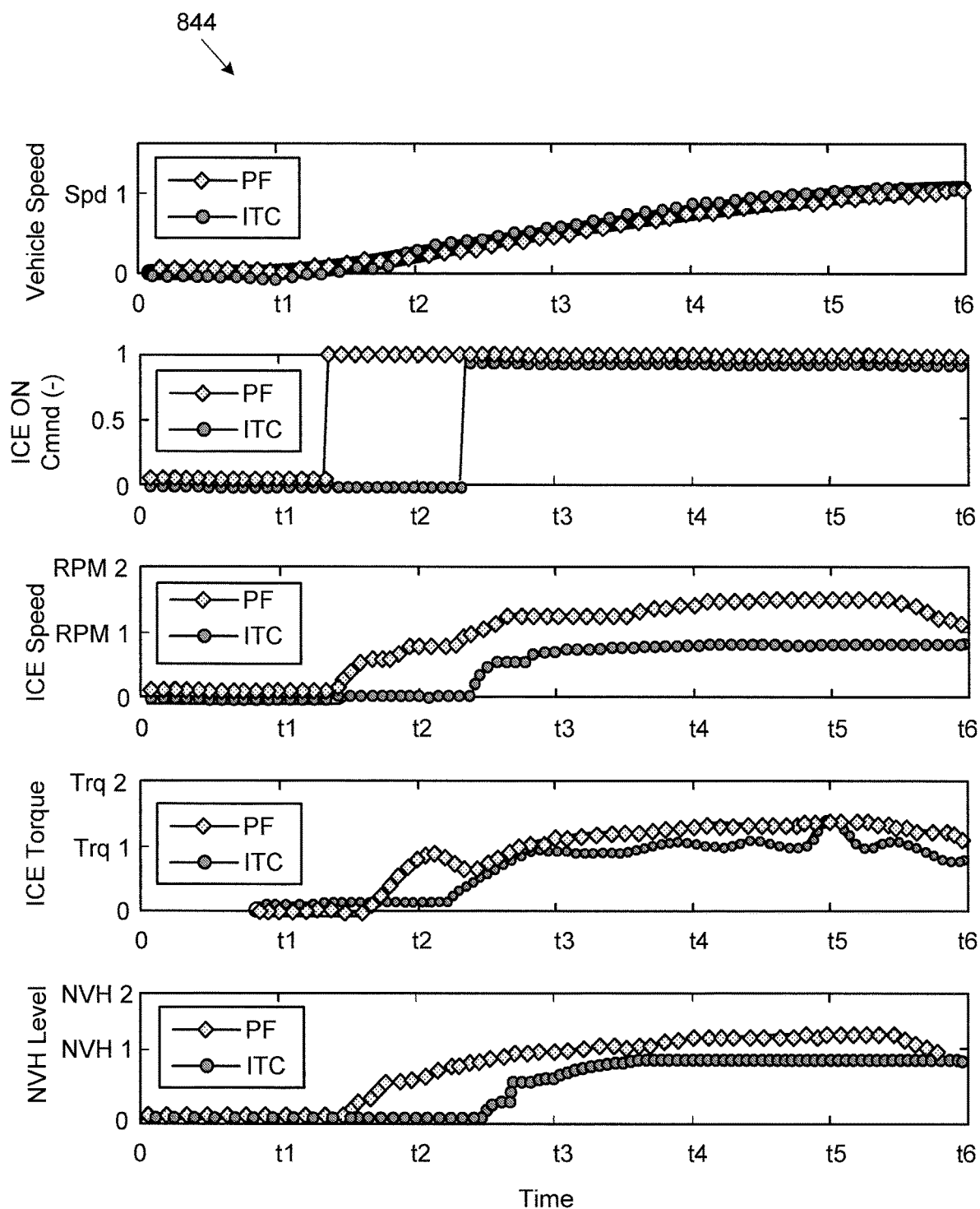
FIG. 8 illustrates a portion of an exemplary vehicle drive cycle including NVH level, ICE torque, ICE speed, ICE ON, and vehicle speed graphs according to one implementation of the present application.

FIG. 8 illustrates a portion of an exemplary vehicle drive cycle including NVH level, ICE torque, ICE speed, ICE ON, and vehicle speed graphs according to one implementation of the present application. Vehicle drive cycle 844 shows graphs of vehicle speed, ICE ON command (which indicates whether the ICE is on or off), ICE speed, ICE torque, and NVH level, versus time.

As shown in FIG. 8, vehicle drive cycle 844 includes two traces. The first trace, indicated visually as diamonds, represents a prior art vehicle controller using a strategy referred to as Power Following (PF). Under a PF vehicle controller, fuel efficiency and NVH are not both accounted for in an initial determination of torque and RPM for an ICE. For example, the PF vehicle controller may create a power demand for the ICE that simply achieves a vehicle speed requested by a driver, and determine a corresponding torque and RPM for the ICE. The PF vehicle controller matches the instantaneous power of the ICE to the instantaneous high voltage bus demand, while not causing the battery to charge or discharge. Then, the PF vehicle controller may reactively limit the power demand for the ICE, or reactively determine a new torque and/or RPM for the ICE. The second trace, indicated visually as shaded circles, represents intelligent vehicle controller 102 in FIG. 1 (or intelligent vehicle controller 202 in FIG. 2) using a strategy referred to as Intelligent Thermostatic Control (ITC).

In vehicle drive cycle 844, a vehicle using a PF vehicle controller is driven similarly to hybrid electric vehicle 100 using intelligent vehicle controller 102 in FIG. 1 (or intelligent vehicle controller 202 in FIG. 2), as shown by the PF and ITC traces overlapping in the graph of vehicle speed versus time.

In the ICE ON command graph, the PF trace goes high at approximately time t1 in vehicle drive cycle 844, whereas the ITC trace does not go high until approximately time t2 in vehicle drive cycle 844. This may be attributable intelligent vehicle controller. 102 in FIG. 1 (or intelligent vehicle controller 202 in FIG. 2) determining a desirable torque and/or a desirable RPM for ICE 104 in FIG. 1 utilizing combined efficiency map 530d in FIG. 5D so as to optimize fuel efficiency. Because ICE 104 in FIG. 1 remains off longer while hybrid electric vehicle 100 accelerates from low speed, battery 110 in FIG. 1 may experience larger SOC deficit, but hybrid electric vehicle 100 consumes less fuel.

In the ICE speed and ICE torque graphs, the PF traces generally vary more frequently than the steadier ITC traces, and the PF traces are generally higher during vehicle drive cycle 844, except that, in the ICE torque graph, the PF trace and the ITC trace are approximately equal at approximately time t5 in vehicle drive cycle 844. Again, this may be attributable intelligent vehicle controller 102 in FIG. 1 (or intelligent vehicle controller 202 in FIG. 2) determining a desirable torque and/or a desirable RPM for ICE 104 in FIG. 1 utilizing combined efficiency map 530d in FIG. 5D so as to optimize fuel efficiency. Because the speed and torque of ICE 104 in FIG. 1 are lower, hybrid electric vehicle 100 consumes less fuel.

In the NVH level graph, the PF trace is generally higher than the ITC trace at all times during vehicle drive cycle 844. This may be attributable intelligent vehicle controller 102 in FIG. 1 (or intelligent vehicle controller. 202 in FIG. 2) determining a desirable torque and/or a desirable RPM for ICE 104 in FIG. 1 utilizing combined efficiency map 530d in FIG. 5D so as to minimize NVH levels of hybrid electric vehicle 100. ICE 104 in FIG. 1 may perform less smoothly during shifts, but hybrid electric vehicle 100 experiences significantly less NVH. While specific differences between the PF and ITC traces are discussed above, the ITC trace is generally more efficient than the PF trace, and generally exhibits lower NVH than the PF trace, under similar driving conditions, because intelligent vehicle controller 102 in FIG. 1 (or intelligent vehicle controller 202 in FIG. 2) is predictive and determines a desirable torque and/or a desirable RPM based on ICE power level shifting data utilizing a combined efficiency map.

Thus, various implementations of the present application achieve a hybrid electric vehicle that overcomes the deficiencies in the art by determining a desirable torque and/or a desirable RPM for an ICE based on ICE power level shifting data by utilizing an efficiency map including fuel efficiency contours and NVH level lines. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A hybrid electric vehicle comprising:
an intelligent vehicle controller;
an electric motor;
a battery;
an internal combustion engine (ICE) coupled to an electrical generator, the electrical generator configured to provide electricity to the battery and the electric motor;
the intelligent vehicle controller configured to:
receive ICE power level shifting data from at least one of the electrical generator, battery, electric motor and ICE;
determine a desired torque and a desired revolutions per minute (RPM) for the ICE based on the received ICE power level shifting data by utilizing an efficiency map, the efficiency map including fuel efficiency contours and noise, vibration, and harshness (NVH) level lines for the hybrid electric vehicle for a plurality of predetermined vehicle operating points, wherein the ICE assigns a first weighting factor to the fuel efficiency contours and a second weighting factor to NVH level lines to determine desired torque and desired RPM; and
generate a control signal to run the ICE at the desired torque and desired RPM according to the plurality of predetermined vehicle operating points of the efficiency map.

2. The hybrid electric vehicle of claim 1, wherein the intelligent vehicle controller:
applies a cost function based on fuel efficiency and NVH level to the efficiency map; and
minimizes the cost function to determine the desired torque and the desired RPM for said ICE.

3. The hybrid electric vehicle of claim 1, wherein the ICE power level shifting data are selected from the group consisting of battery charge capability, electrical generator capability, vehicle speed, state-of-charge (SOC) deficit, and high voltage bus demand.

4. The hybrid electric vehicle of claim 1, wherein the intelligent vehicle controller determines desired torque and desired RPM to optimize fuel consumption during power demand.

5. The hybrid electric vehicle of claim 1, wherein the intelligent vehicle controller generates a control signal for a variable exhaust valve based on said desirable torque and/or said desirable RPM.

6. The hybrid electric vehicle of claim 1, wherein the efficiency map further includes emission contours.

7. A hybrid electric vehicle comprising:
an intelligent vehicle controller;
an electric motor;
a battery;

an internal combustion engine (ICE) coupled to an electrical generator, the electrical generator configured to provide electricity to the battery and the electric motor;
the intelligent vehicle controller configured to:
receive ICE power level shifting data from at least one of the electrical generator, battery, electric motor and ICE;
derive a desirable desired power level for the ICE by evaluating the ICE power level shifting data, including at least one of a battery charge capability, an electrical generator capability, a present vehicle speed, a present SOC deficit, and a present high voltage bus demand, wherein the desired power level is determined for a plurality of predetermined vehicle operating points, wherein the ICE assigns a first weighting factor to fuel efficiency and a second weighting factor to noise, vibration, and harshness (NVH) to determine desired power level; and
generate a control signal to run the ICE at the desired power level according to the plurality of predetermined vehicle operating points.

8. The hybrid electric vehicle of claim 7, wherein the intelligent vehicle controller determines a desired torque and a desired revolutions per minute per minute (RPM) for the ICE based on the desired power level by utilizing an efficiency map, the efficiency map including fuel efficiency contours and noise, vibration, and harshness (NVH) level lines for the hybrid electric vehicle.

9. The hybrid electric vehicle of claim 8, wherein the intelligent vehicle controller:
applies a cost function based on fuel efficiency and NVH level to the efficiency map;
minimizes the cost function to determine the desired torque and the desired RPM for the ICE.

10. The hybrid electric vehicle of claim 8, wherein the intelligent vehicle controller assigns the first weighting factor to the fuel efficiency contours and the second weighting factor to the NVH level lines when determining the desired torque and the desired RPM for the ICE.

11. The hybrid electric vehicle of claim 8, wherein the intelligent vehicle controller generates a control signal for a variable exhaust valve based on the desired torque and the desired RPM.

12. The hybrid electric vehicle of claim 8, wherein the efficiency map further includes emission contours.

13. A hybrid electric vehicle comprising:
an intelligent vehicle controller;
an electric motor;
a battery;
an internal combustion engine (ICE) coupled to an electrical generator, the electrical generator configured to provide electricity to the battery and the electric motor;
the intelligent vehicle controller having a first vehicle operation mode and a second vehicle operation mode;
the intelligent vehicle controller configured to:
receive ICE power level shifting data from at least one of the electrical generator, battery, electric motor and ICE;
derive a desired power level for the ICE in the first vehicle operation mode based on the ICE power level shifting data;
derive a second desired power level for the ICE in the second vehicle operation mode based on the ICE power level shifting data,
wherein desired power levels are determined for a plurality of predetermined vehicle operating points, wherein the ICE assigns a first weighting factor to fuel efficiency and a second weighting factor to noise, vibration, and harshness (NVH) to determine desired power level; and
generate a control signal to run the ICE at a desired power level according to the plurality of predetermined vehicle operating points and vehicle operation mode.

14. The hybrid electric vehicle of claim 13, wherein said intelligent vehicle controller determines a desired torque and a desired revolutions per minute (RPM) for the ICE based on the received ICE power level shifting data by utilizing an efficiency map, the efficiency map including fuel efficiency contours and noise, vibration, and harshness (NVH) level lines for the hybrid electric vehicle.

15. The hybrid electric vehicle of claim 7, wherein the first and second vehicle operation modes are selected from the group consisting of a normal mode, a recovery mode, and a sports mode.

16. The hybrid electric vehicle of claim 7, wherein the intelligent vehicle controller automatically selects one of the first and second vehicle operation modes based on the ICE power level shifting data.

17. The hybrid electric vehicle of claim 8, wherein the intelligent vehicle controller:
applies a cost function based on fuel efficiency and NVH level to the efficiency map;
minimizes the cost function to determine the desired torque and the desired RPM for the ICE.

18. The hybrid electric vehicle of claim 1, wherein the ICE power level shifting data are selected from the group consisting of battery charge capability, electrical generator capability, vehicle speed, state-of-charge (SOC) deficit, and high voltage bus demand.

19. The hybrid electric vehicle of claim 7, wherein the intelligent vehicle controller assigns a first weighting factor to the fuel efficiency contours and a second weighting factor to the NVH level lines when determining the desired torque and the desired RPM for the ICE.

20. The hybrid electric vehicle of claim 7, wherein the intelligent vehicle controller generates a control signal for a variable exhaust valve based on the desired torque and the desired RPM.

* * * * *